(12) United States Patent
Ok et al.

(10) Patent No.: US 11,281,042 B2
(45) Date of Patent: Mar. 22, 2022

(54) OPTICAL FILM AND DISPLAY DEVICE INCLUDING THE SAME

(71) Applicant: Samsung Display Co., Ltd., Yongin-Si (KR)

(72) Inventors: Jongmin Ok, Hwaseong-si (KR); Young Gu Kim, Yongin-si (KR); Jiyun Park, Hwaseong-si (KR); Jongho Son, Seoul (KR); Sun-Young Chang, Seoul (KR); Hyelim Jang, Hwaseong-si (KR); Baekkyun Jeon, Yongin-si (KR); Kyungseon Tak, Hwaseong-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 16/896,113

(22) Filed: Jun. 8, 2020

(65) Prior Publication Data

US 2021/0018792 A1 Jan. 21, 2021

(30) Foreign Application Priority Data

Jul. 18, 2019 (KR) ........................ 10-2019-0086713

(51) Int. Cl.
*G02F 1/1335* (2006.01)
*G02B 5/02* (2006.01)

(52) U.S. Cl.
CPC ..... *G02F 1/133504* (2013.01); *G02B 5/0215* (2013.01); *G02B 5/0278* (2013.01)

(58) Field of Classification Search
CPC .. G02B 5/0278; G02B 5/0215; G02B 5/1866; G02F 1/133526; G02F 1/133504; G02F 1/133524; G02F 1/1323; G02F 1/1309
See application file for complete search history.

(56) References Cited

U.S. PATENT DOCUMENTS

| | | | |
|---|---|---|---|
| 9,341,750 B2 | 5/2016 | Shim et al. | |
| 9,507,059 B2 | 11/2016 | Shim et al. | |
| 9,507,060 B2 | 11/2016 | Shim et al. | |
| 9,575,217 B2 | 2/2017 | Shim et al. | |
| 10,268,063 B2 | 4/2019 | Ju et al. | |
| 2012/0307191 A1 | 12/2012 | Park et al. | |
| 2013/0010227 A1* | 1/2013 | Wang | G02B 6/0053 349/61 |

(Continued)

FOREIGN PATENT DOCUMENTS

JP 6159385 B2 7/2017
KR 10-2012-0133084 A 12/2012

(Continued)

*Primary Examiner* — Thoi V Duong
(74) *Attorney, Agent, or Firm* — Innovation Counsel LLP

(57) ABSTRACT

An optical film may include a first pattern layer having a first refractive index and including a base portion and a plurality of protrusions on the base portion x, and a second pattern layer disposed on the first pattern layer and having a second refractive index different from the first refractive index. Each of the protrusions may include n sub-protrusions (n is an integer of 2 or greater), which are stacked in a thickness direction of the base portion. Each of the n sub-protrusions may have a quadrilateral shape. A side surface of the protrusion defined by the n sub-protrusions may include at least one step portion. The optical film improves display quality of a display device in front and lateral directions.

23 Claims, 26 Drawing Sheets

(56) References Cited

U.S. PATENT DOCUMENTS

| | | |
|---|---|---|
| 2013/0016316 A1 | 1/2013 | Cheng et al. |
| 2016/0252665 A1 | 9/2016 | Lee et al. |
| 2017/0038645 A1 | 2/2017 | Suwa et al. |
| 2017/0207421 A1* | 7/2017 | Matsuzaki .......... H01L 51/5253 |
| 2018/0217306 A1 | 8/2018 | Wang et al. |
| 2019/0072698 A1 | 3/2019 | Wee et al. |

FOREIGN PATENT DOCUMENTS

| | | |
|---|---|---|
| KR | 10-1616918 B1 | 4/2016 |
| KR | 10-1659241 B1 | 9/2016 |
| KR | 10-2019-0027688 A | 3/2019 |
| KR | 10-2020-0138560 A | 12/2020 |

* cited by examiner

OPTICAL FILM AND DISPLAY DEVICE INCLUDING THE SAME

CROSS-REFERENCE TO RELATED APPLICATIONS

This U.S. non-provisional patent application claims priority to and benefit of 35 U.S.C. § 119 to Korean Patent Application No. 10-2019-0086713, filed on Jul. 18, 2019, in the Korean Intellectual Property Office, the entire contents of the Korean Patent Application which are hereby incorporated by reference.

BACKGROUND OF THE INVENTION

The present disclosure relates to an optical film and a display device including the optical film, and in particular, to an optical film including two pattern layers whose refractive indices are different from each other, and a liquid crystal display device including the optical film.

Currently, various display devices are used to display images. For example, due to its low power consumption, liquid crystal display devices are widely used for in large-size display devices, portable display devices, and so forth.

In the liquid crystal display device, light emitted from a backlight unit is provided to a liquid crystal display panel displaying an image. The liquid crystal display device further includes various optical films, which are disposed outside the liquid crystal display panel to prevent poor display quality (e.g., problems with viewing angles).

SUMMARY

An embodiment of the inventive concept provides an optical film to improve lateral viewing angle characteristics of a display device.

An embodiment of the inventive concept provides an optical film, in which a shape of a pattern layer is optimized, and a display device improving lateral viewing angle characteristics using the optical film.

According to an embodiment of the inventive concept, an optical film may include a first pattern layer having a first refractive index and including a base portion and a plurality of protrusions on the base portion, and a second pattern layer disposed on the first pattern layer having a second refractive index different from the first refractive index. Each of the plurality of protrusions may include n sub-protrusions (n is an integer of 2 or greater), which are stacked in a thickness direction of the base portion. Each of the n sub-protrusions may have a quadrilateral shape, when viewed in a sectional view perpendicular to the base portion. A side surface of the protrusion defined by the n sub-protrusions may include at least one step portion.

In an embodiment, the n sub-protrusions may each have a rectangular or trapezoidal shape, when viewed in a sectional view perpendicular to the base portion.

In an embodiment, each of the sub-protrusions may include a bottom surface adjacent to the base portion, an upper surface opposite to the bottom surface, and a side surface connecting the bottom surface to the upper surface, and an inclination angle of the side surface relative to the bottom surface may range from 45° to 90°.

In an embodiment, in each of the plurality of protrusions, a ratio of a height of the protrusion to a width of the bottom surface may satisfy the condition given by the following formula 1:

$$0.3 \leq \text{(height of protrusion)/(width of bottom surface of protrusion)} \leq 3.0. \quad \text{[Formula 1]}$$

In the Formula 1, the width of the bottom surface of the protrusion may be the smallest width of the bottom surface, when measured in a section perpendicular to the base portion and the height of the protrusion may be the smallest distance between the bottom surface and the upper surface, when measured in a section perpendicular to the base portion.

In an embodiment, the step portion may be defined by an exposed surface of an m-th sub-protrusion and a side surface of an (m+1)-th sub-protrusion (m is an integer that is greater than or equal to 1 and is smaller than and equal to (n−1)), the exposed surface may be a portion of an upper surface of the m-th sub-protrusion, which is not overlapped with the (m+1)-th sub-protrusion.

In an embodiment, a width of the exposed surface and a length of the side surface of the sub-protrusion may each range from 1 μm to 10 μm.

In an embodiment, the step portion may be defined by the side surfaces of adjacently-stacked ones of the sub-protrusions.

In an embodiment, the smallest width of an upper surface of the n-th sub-protrusion may be greater than 0 μm and may be smaller than or equal to 10 μm.

In an embodiment, a difference between the first refractive index and the second refractive index may be greater than or equal to 0.1.

In an embodiment, the smallest distance between adjacent ones of the plurality of protrusions may range from 0 μm to 10 μm.

In an embodiment, each of the plurality of protrusions may have a center and a symmetric shape with respect to an imaginary line passing through the center and extending in the thickness direction, when viewed in a sectional view perpendicular to the base portion.

In an embodiment, each of the plurality of protrusions may further include an edge protrusion disposed on the n-th sub-protrusion, and the edge protrusion may have a triangular shape.

In an embodiment, the n sub-protrusions may have sectional areas, that decrease in area with increasing distance from the base portion, when measured in a section perpendicular to the base portion.

In an embodiment, each of the plurality of protrusions may have a stripe shape extending in a specific direction.

According to an embodiment of the inventive concept, an optical film may include a first pattern layer having a first refractive index and which includes a base portion and a plurality of protrusions on the base portion, and a second pattern layer, which is disposed on the first pattern layer and has a second refractive index different from the first refractive index. Each of the plurality of protrusions may include a first sub-protrusion having a first quadrilateral shape, and a second sub-protrusion disposed on the first sub-protrusion and having a second quadrilateral shape, when viewed in a sectional view perpendicular to the base portion. The first sub-protrusion may include a first bottom surface adjacent to the base portion, a first upper surface opposite to the first bottom surface, and a first side surface connecting the first bottom surface to the first upper surface. The second sub-protrusion may include a second bottom surface adjacent to the first sub-protrusion, a second upper surface opposite to the second bottom surface, and a second side surface connecting the second bottom surface to the second upper surface. The smallest width of the second upper surface may be smaller than the smallest width of the first upper surface, when measured in a section perpendicular to the base portion.

In an embodiment, each of the plurality of protrusions may further include a third sub-protrusion disposed on the second sub-protrusion. The third sub-protrusion may include a third bottom surface adjacent to the second sub-protrusion, a third upper surface opposite to the third bottom surface, and a third side surface connecting the third bottom surface to the third upper surface. The smallest width of the third upper surface may be smaller than the smallest width of the second upper surface, when measured in a section perpendicular to the base portion.

In an embodiment, a first inclination angle of the first side surface to the first bottom surface, a second inclination angle of the second side surface to the second bottom surface, and a third inclination angle of the third side surface to the third bottom surface may each range from 45° to 90°.

In an embodiment, each of the plurality of protrusions may have a polygonal shape having eleven or more sides, when viewed in a sectional view perpendicular to the base portion.

According to an embodiment of the inventive concept, a display device may include a liquid crystal display panel and an optical film disposed on the liquid crystal display panel. The optical film may include a first pattern layer having a first refractive index and including a base portion and a plurality of protrusions on the base portion, and a second pattern layer, which is disposed on the first pattern layer and has a second refractive index different from the first refractive index. Each of the plurality of protrusions may include n sub-protrusions (n is an integer of 2 or greater), which are stacked in a thickness direction of the base portion. Each of the n sub-protrusions may have a quadrilateral shape, when viewed in a sectional view perpendicular to the base portion . . . . A side surface of the protrusion defined by the n sub-protrusions may include at least one step portion.

In an embodiment, the n sub-protrusions may each have a rectangular or trapezoidal shape, when viewed in a sectional view perpendicular to the base portion.

In an embodiment, each of the sub-protrusions may include a bottom surface adjacent to the base portion, an upper surface opposite to the bottom surface, and a side surface connecting the bottom surface to the upper surface. An inclination angle of the side surface relative to the bottom surface may range from 45° to 90°.

In an embodiment, the step portion may be defined by an exposed surface of an m-th sub-protrusion and a side surface of an (m+1)-th sub-protrusion (m may be an integer that is greater than or equal to 1 and is smaller than and equal to (n−1)). The exposed surface may be a portion of an upper surface of the m-th sub-protrusion, which is not overlapped with the (m+1)-th sub-protrusion.

In an embodiment, the step portion may be defined by the side surfaces of adjacently-stacked ones of the sub-protrusions.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

Figure 1:
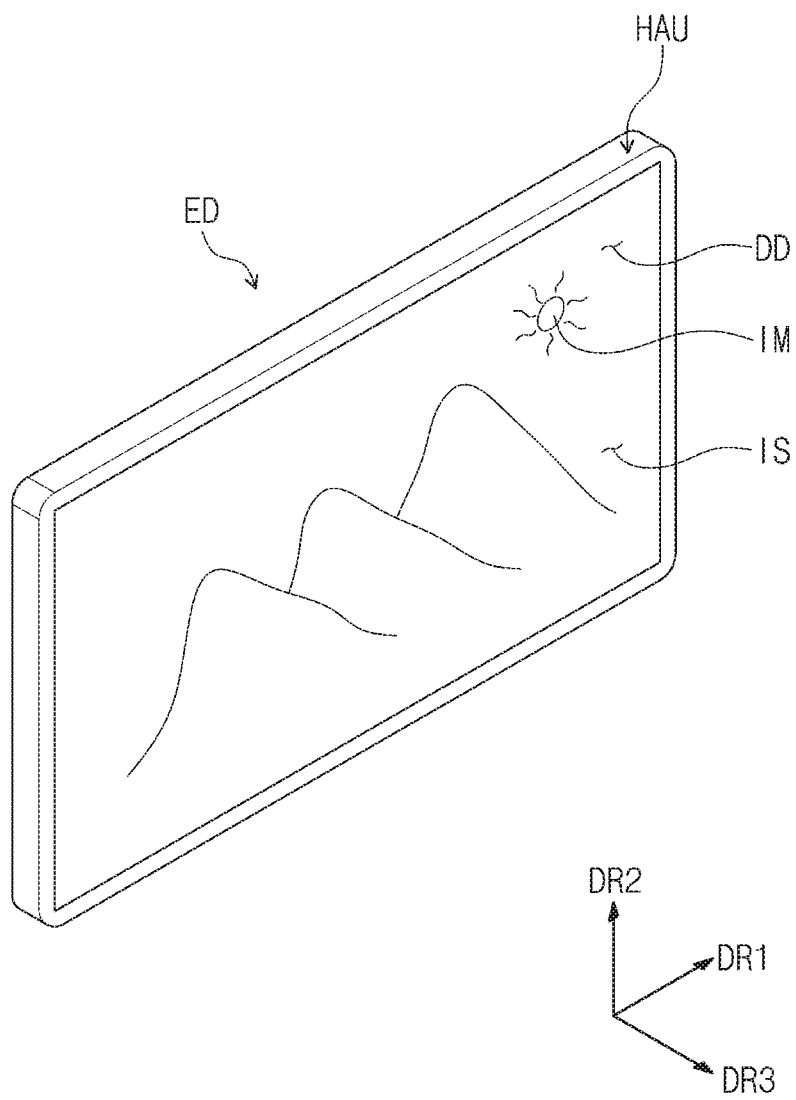
FIG. 1 is a perspective view illustrating an electronic device according to an embodiment.

It should be noted that these figures are intended to illustrate the general characteristics of methods, structure and/or materials utilized in certain example embodiments and to supplement the written description provided below. These drawings are not, however, necessarily to scale, and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION

Example embodiments of the inventive concepts will now be described more fully with reference to the accompanying drawings, in which example embodiments are shown. Example embodiments of the inventive concepts may, however, be embodied in many different forms and should not be construed as being limited to the embodiments set forth herein; rather, these embodiments are provided so that this disclosure will be thorough and complete, and will fully convey the concept of example embodiments to those of ordinary skill in the art. In the drawings, the thicknesses of layers and regions are exaggerated for clarity. Like reference numerals in the drawings denote like elements, and thus their description will be omitted.

When an element is referred to as being "connected" or "coupled" to another element, it can be directly connected or coupled to the other element or intervening elements may be present. When an element is referred to as being "directly connected" or "directly coupled" to another element, there are no intervening elements present. Other words used to describe the relationship between elements or layers should be interpreted in a like fashion (e.g., "between" versus "directly between," "adjacent" versus "directly adjacent," "on" versus "directly on"). Like reference numerals may indicate like elements throughout. As used herein the term "and/or" includes any and all combinations of one or more of the associated listed items. Although the terms "first", "second", etc. may be used herein to describe various elements, components, regions, layers and/or sections, these elements, components, regions, layers and/or sections should not be limited by these terms. These terms may be used to distinguish one element, component, region, layer or section from another element, component, region, layer or section. Thus, a first element, component, region, layer or section discussed below could be termed a second element, component, region, layer or section without departing from the teachings of example embodiments. The description of an element as a "first" element may not require or imply the presence of a second element or other elements. The terms "first," "second," etc. may be used to differentiate different categories or sets of elements. For conciseness, the terms "first," "second," etc. may represent "first-type (or first-set)," "second-type (or second-set)," etc., respectively.

Spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" may include the plural forms as well, unless the context clearly indicates otherwise. The terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof.

Example embodiments of the inventive concepts are described herein with reference to cross-sectional illustrations that are schematic illustrations of idealized embodiments (and intermediate structures) of example embodiments. As such, variations from the shapes of the illustrations as a result, for example, of manufacturing techniques and/or tolerances, are to be expected. Thus, example embodiments of the inventive concepts should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which example embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Figure 2:
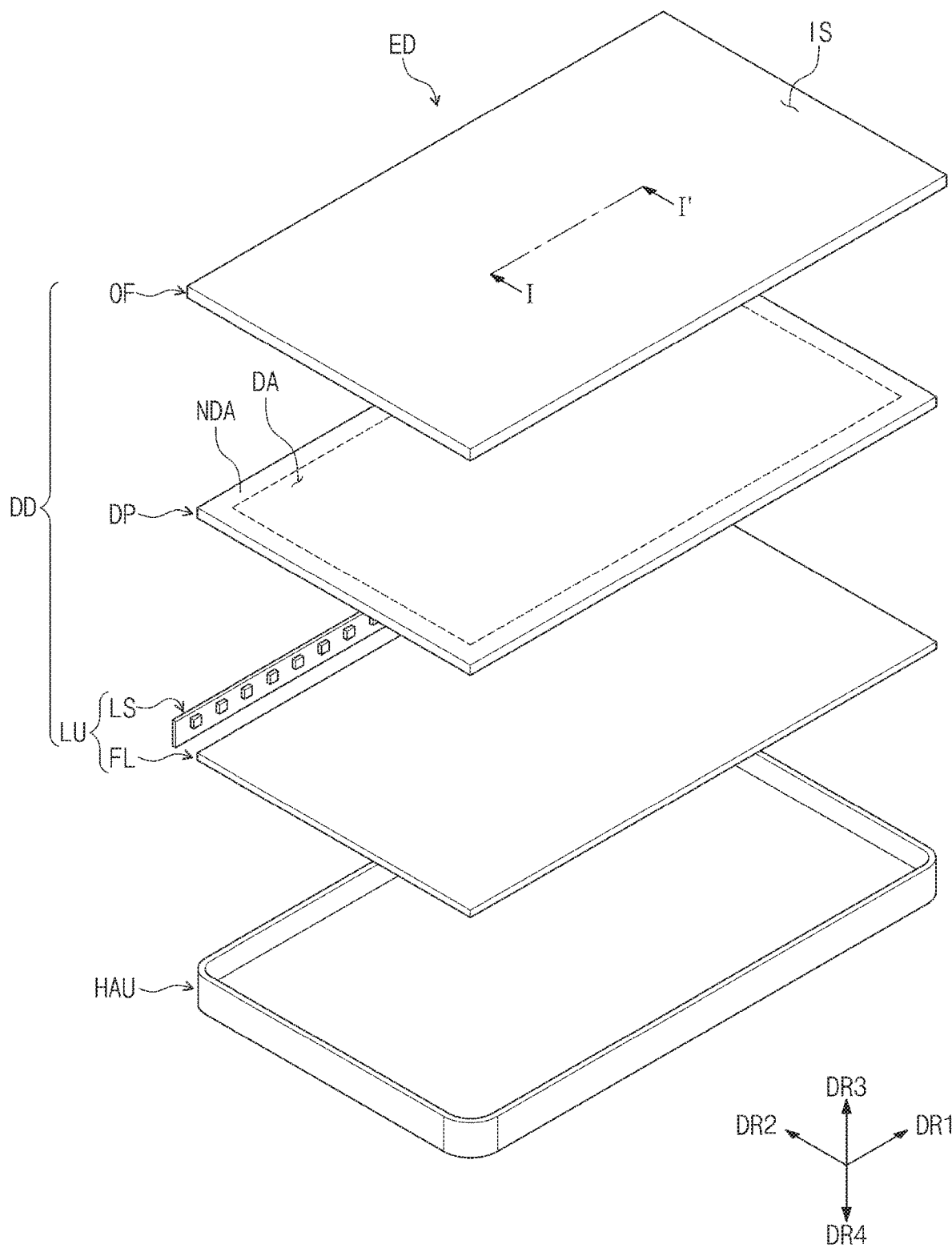
FIG. 2 is an exploded perspective view of the electronic device shown in FIG. 1.
Figure 3:
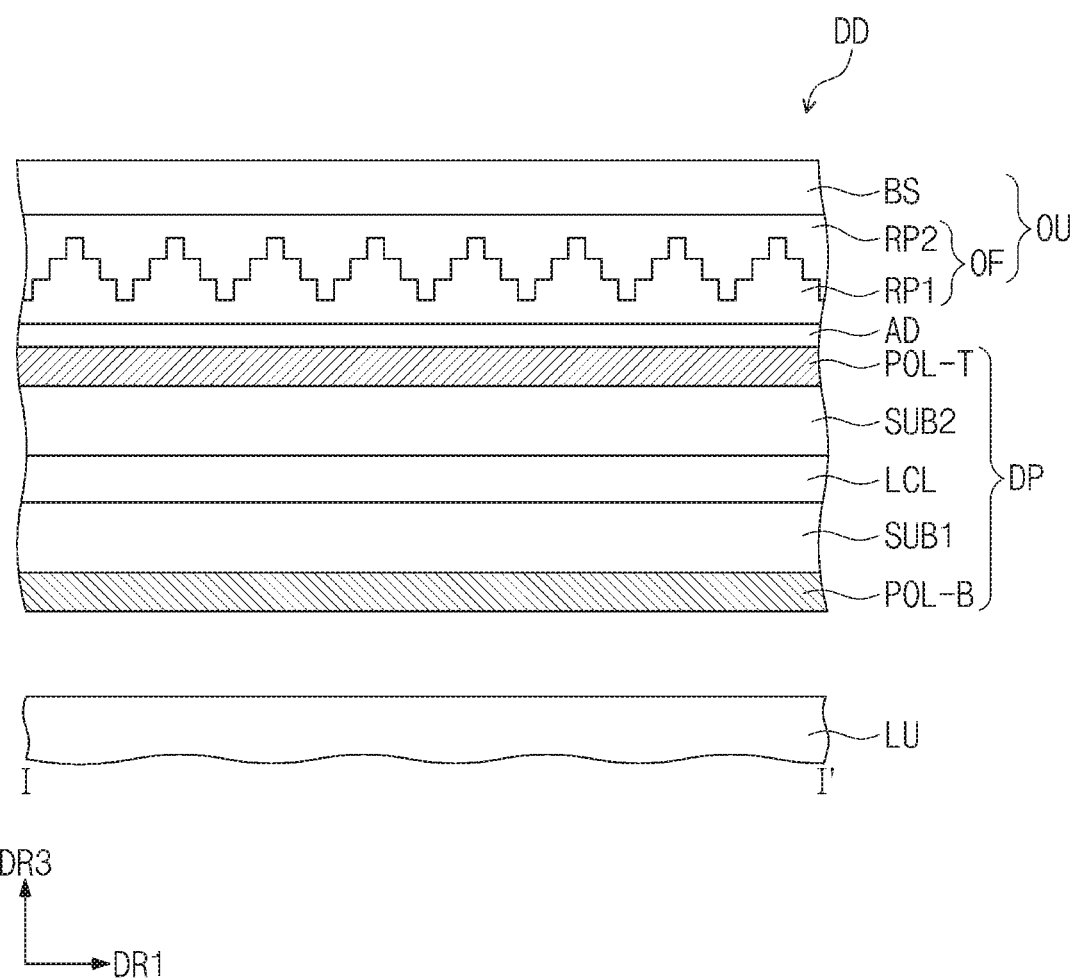
FIG. 3 is a sectional view illustrating a display device according to an embodiment.
Figure 4:
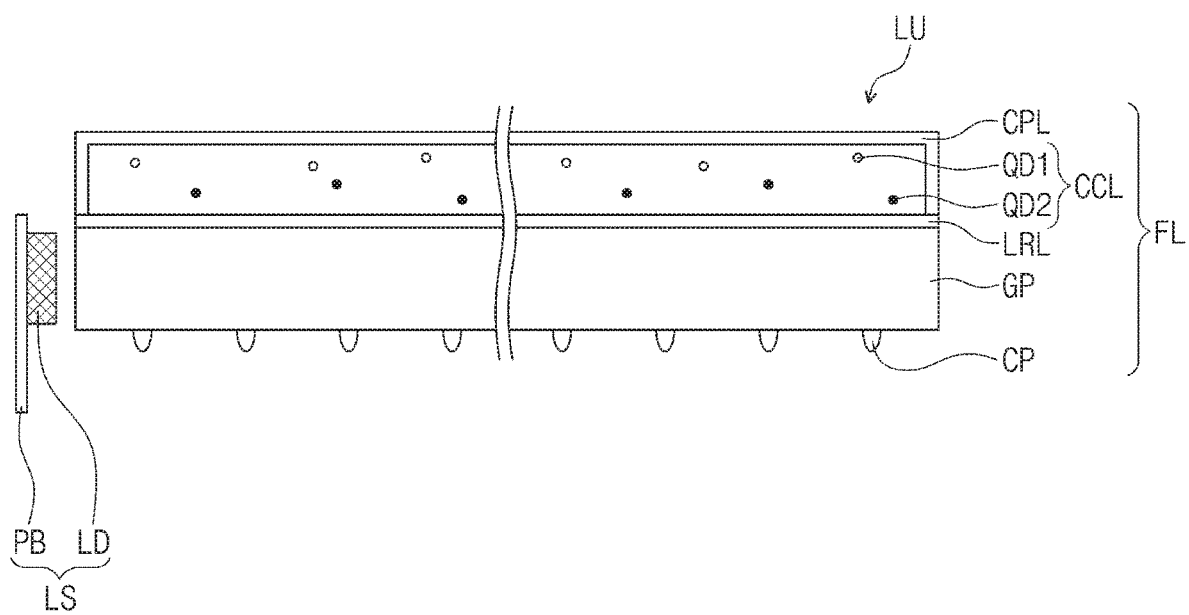
FIG. 4 is a sectional view illustrating a light source unit according to an embodiment.

FIG. 1 is a perspective view illustrating an electronic device. FIG. 2 is an exploded perspective view of the electronic device shown in FIG. 1. FIG. 2 is a sectional view taken along a line I-I' of FIG. 1. FIG. 3 is a sectional view of a display device according to an embodiment of the inventive concept. FIG. 4 is a sectional view of a light source unit according to an embodiment of the inventive concept.

Figure 5:
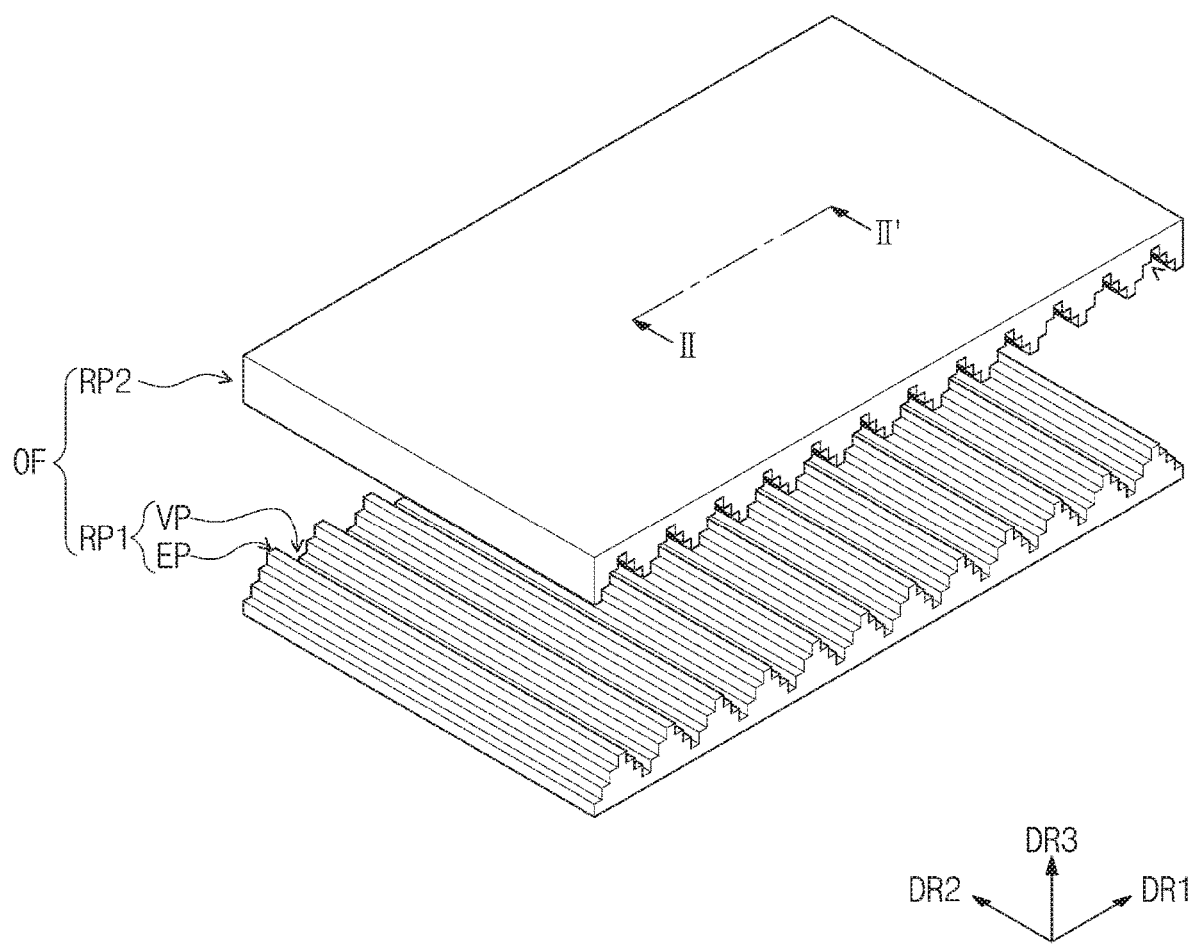
FIG. 5 is an exploded perspective view illustrating an optical film according to an embodiment.
Figure 6:
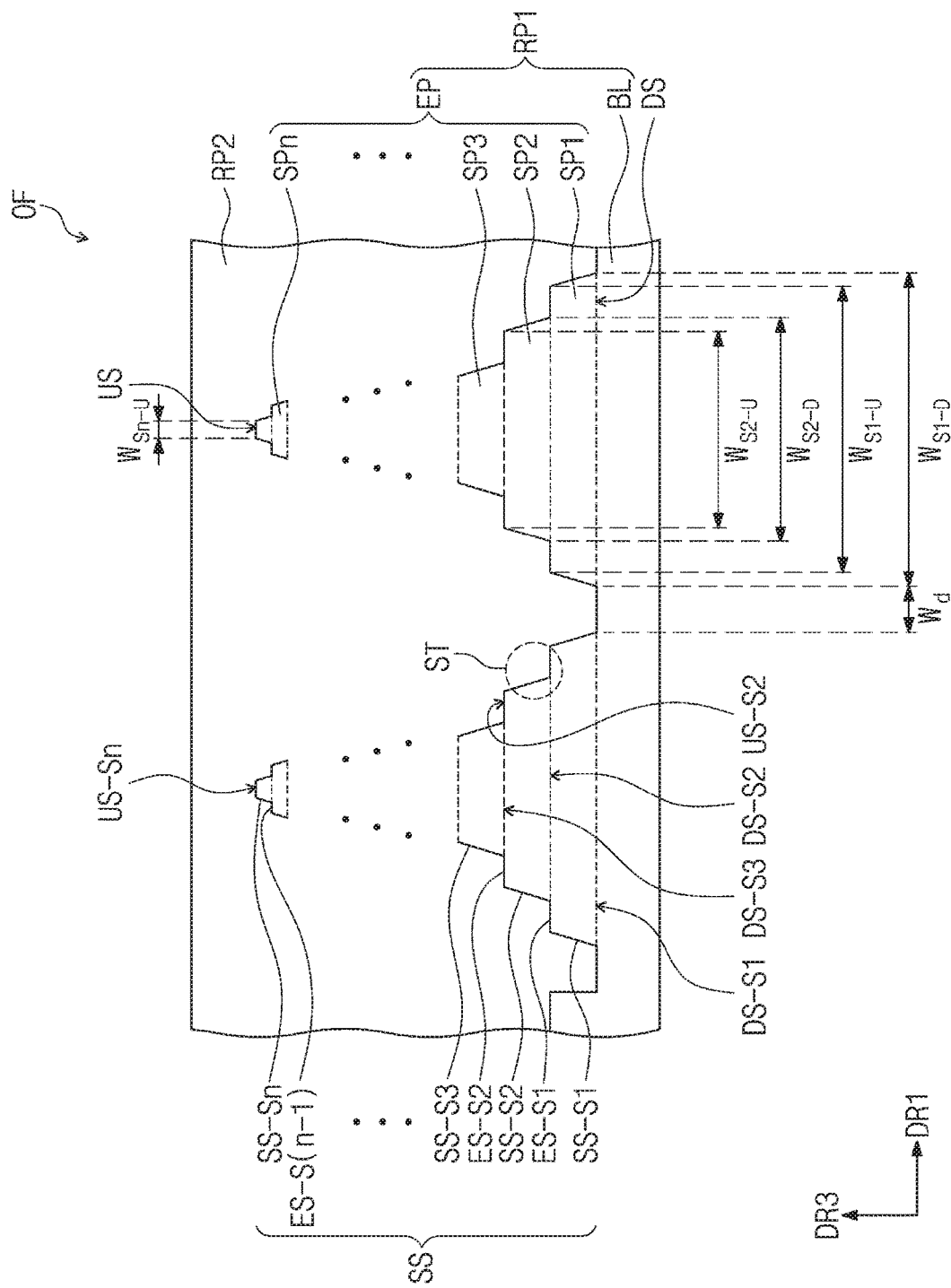
FIG. 6 is a sectional view illustrating a portion of an optical film according to an embodiment of the inventive concept.
Figure 7:
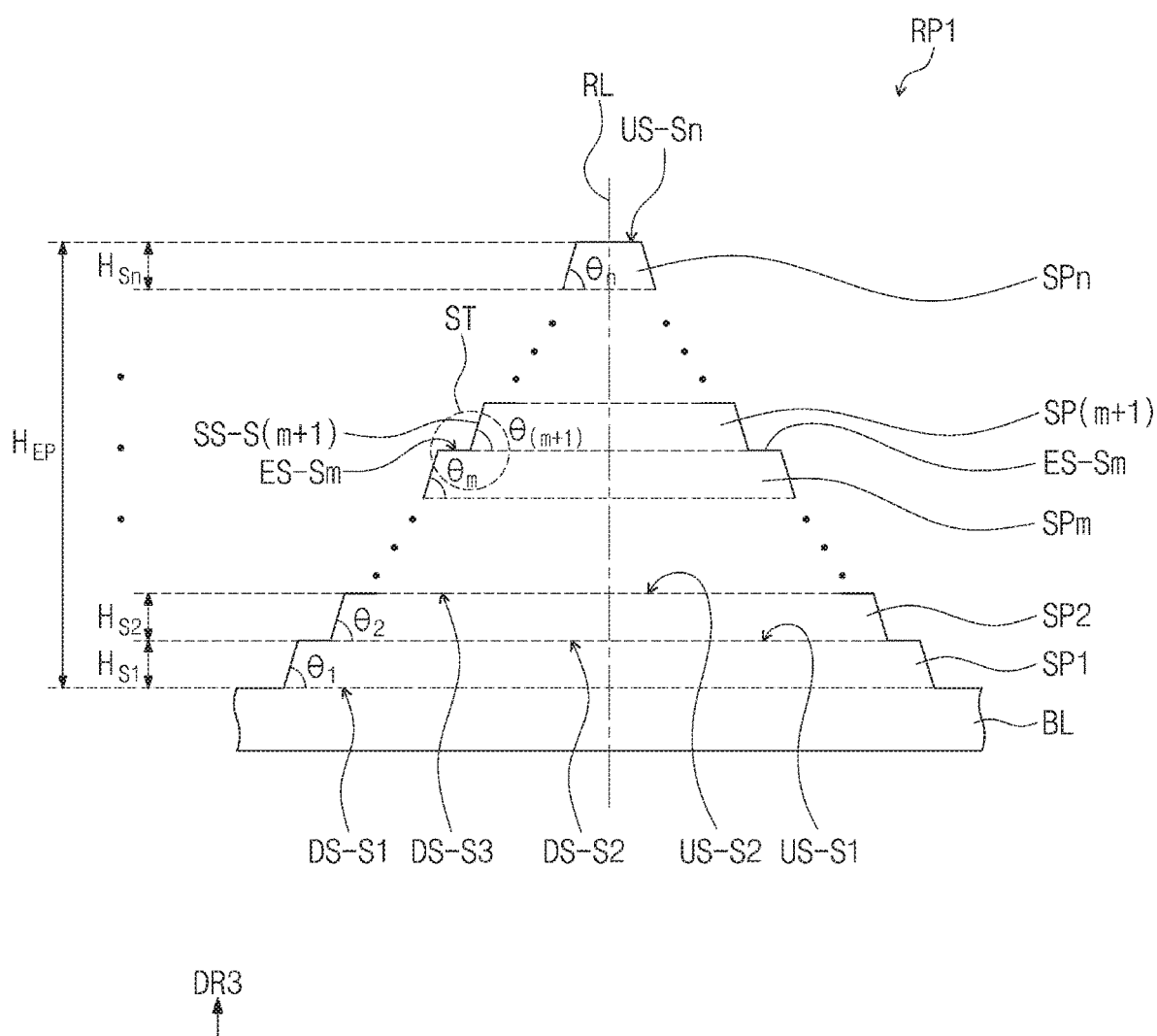
FIG. 7 is a sectional view illustrating a shape of a protrusion of an optical film according to an embodiment.
Figure 8:
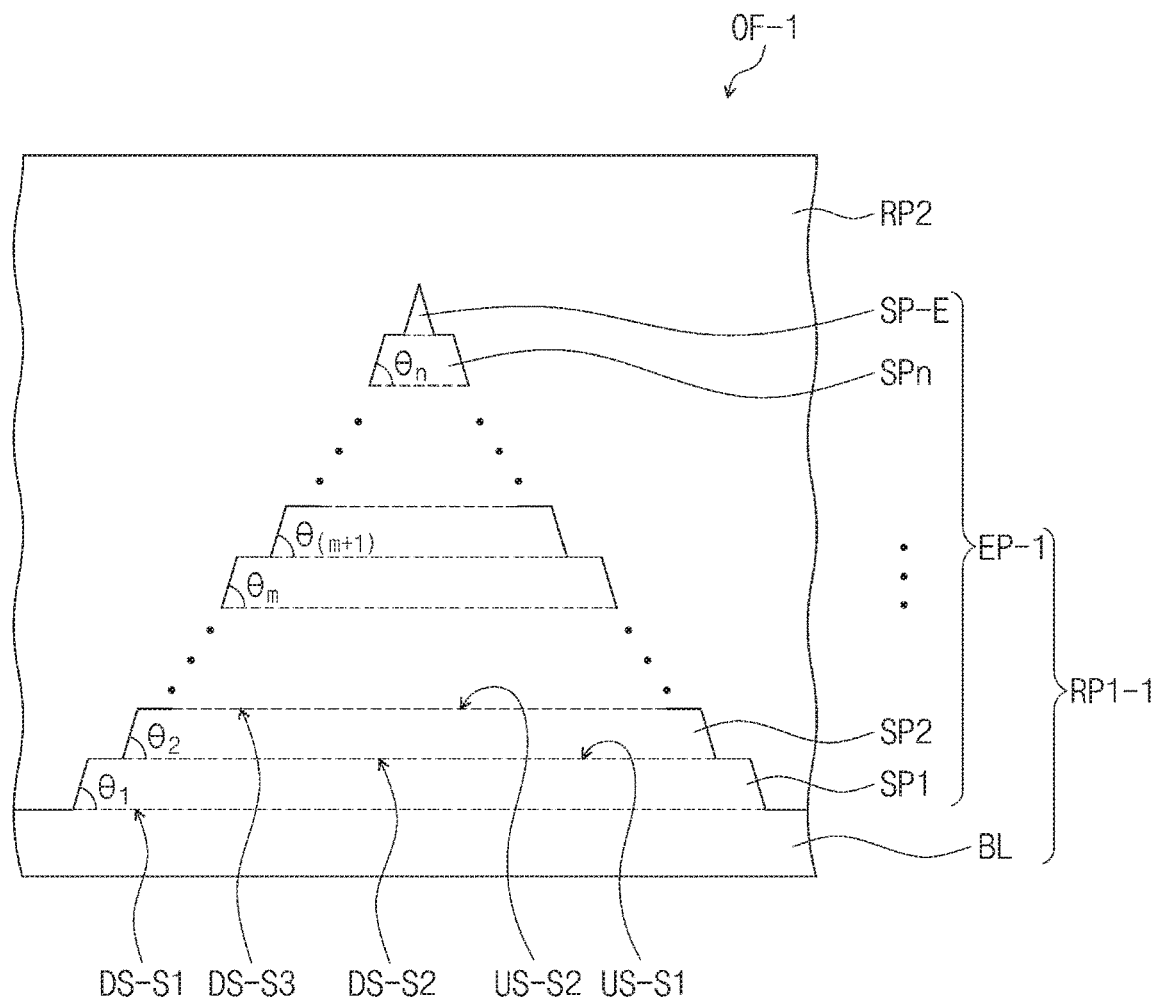
FIG. 8 is a sectional view illustrating a portion of an optical film according to an embodiment.

FIGS. 5 to 8 are diagrams illustrating an optical film according to an embodiment of the inventive concept. FIG. 5 is an exploded perspective view of the optical film according to an embodiment of the inventive concept. FIGS. 6 to 8 are sectional views illustrating a portion of the optical film according to an embodiment of the inventive concept.

In an embodiment, an electronic device ED may be a large-sized electronic devices (e.g., television sets, monitors, and outdoor billboards). In an embodiment, the electronic device ED may be a small- or medium-sized electronic devices (e.g., personal computers, laptop computers, personal digital assistants, car navigation systems, game machines, smart phones, tablets, and cameras).

The electronic device ED may include a display device DD and a housing HAU. The electronic device ED may display an image IM through a display surface IS. In FIG. 1, the display surface IS is illustrated to be parallel to a plane defined by a first direction axis DR1 and a second direction axis DR2 crossing each other. In an embodiment, the display surface IS of the electronic device ED may have a curved shape.

A third direction axis DR3 may be used to indicate a direction normal to the display surface IS (i.e., a direction that is parallel to a thickness direction of the electronic device ED, and in which the image IM is displayed). In addition, a fourth direction axis DR4 may be used to indicate a direction that is opposite to the third direction axis DR3 and is parallel to the thickness direction of the electronic device ED. A front or top surface and a rear or bottom surface of each member may be distinguished based on the third direction axis DR3. Directions indicated by the first to fourth direction axes DR1, DR2, DR3, and DR4 may be relative concepts.

The housing HAU may contain the display device DD. The housing HAU may be disposed to cover the display device DD but to expose the display surface IS (e.g., a top surface of the display device DD) of the display device DD. The housing HAU may cover side and bottom surfaces of the display device DD and may expose the entire top surface of the display device DD. In an embodiment, the housing HAU may be provided to cover not only the side and bottom surfaces of the display device DD but also a portion of the top surface.

The display device DD may include a light source unit LU, a liquid crystal display panel DP, and an optical unit OU. The light source unit LU may be disposed below the liquid crystal display panel DP, and the optical unit OU may be disposed on the liquid crystal display panel DP.

The optical unit OU may include an optical film OF. The optical film OF may be disposed on the liquid crystal display panel DP. The optical unit OU may include a base film BS supporting the optical film OF.

FIG. 4 is a sectional view illustrating the light source unit LU according to an embodiment. The light source unit LU may include a light source LS and functional layers FL delivering light, emitted from the light source LS, to the liquid crystal display panel DP. The functional layers FL may include a guide panel GP, a low refractive layer LRL disposed on the guide panel GP, and a color conversion layer CCL disposed on the low refractive layer LRL. The light source LS may be disposed to face at least one side surface of the guide panel GP. The light source unit LU may further include a barrier layer CPL disposed on the color conversion layer CCL. A plurality of light-emitting patterns CP may be disposed on a bottom surface of the guide panel GP.

In the light source unit LU, the light source LS may include a circuit substrate PB and a plurality of light-emitting device packages LD, which are disposed on the circuit substrate PB. The light-emitting device packages LD may emit light of the same wavelength range. In certain embodiments, the light source LS may include the light-emitting device packages LD, which emit light in at least two different wavelength ranges. In an embodiment, the light-emitting device package LD may emit a first light, whose peak wavelength is within a wavelength range from 440 nm to 460 nm. In an embodiment, the light-emitting device package LD may be configured to emit blue light. Hereinafter, the expression "a value ranges from A to B" will be used to mean that the value is greater than or equal to A and is smaller than or equal to B.

In an embodiment shown in FIG. 2, the light source LS is disposed near one side surface of the guide panel GP. However, the light source LS may be disposed to face two or more side surfaces of the guide panel GP.

In an embodiment, the light source LS may be disposed below the guide panel GP. That is, the light source LS may be provided as a direct-type light source.

The guide panel GP may be a glass substrate. The guide panel GP may be a transparent resin substrate. For example, the guide panel GP may be formed to include an acrylic resin or the like.

The light-emitting patterns CP disposed on the bottom surface of the guide panel GP may change a propagation path of light incident on the light-emitting patterns CP. For example, the light-emitting patterns CP may transmit light, which is incident into a side surface of the guide panel GP from the light source LS, to another side surface of the guide panel GP. The light-emitting patterns CP may transmit light, which is incident toward a bottom surface of the guide panel GP, toward an emission surface (e.g., a top surface) of the guide panel GP.

The low refractive layer LRL may be disposed on the guide panel GP. The low refractive layer LRL may be directly disposed on the guide panel GP. A refractive index of the low refractive layer LRL may be smaller than a refractive index of the guide panel GP. Accordingly, the low refractive layer LRL may allow light, which is incident into a side surface of the guide panel GP from the light source LS, to be effectively transmitted to another side surface of the guide panel GP that is relatively spaced apart from the light source LS. That is, in the light source unit LU, the guide panel GP and the low refractive layer LRL provided on the guide panel GP may serve as a light guide plate.

The light source unit LU may include the color conversion layer CCL disposed on the low refractive layer LRL. The color conversion layer CCL may change a color or wavelength of light that is provided from the light source LS. For example, the light may be changed to a white light when it passes through the color conversion layer CCL. In an embodiment, the color conversion layer CCL may include a plurality of quantum dots QD1 and QD2, which change the incident light to lights of different wavelengths or colors. When the light source LS emits a blue light (also referred to as a first light), the color conversion layer CCL may include a first quantum dot QD1, which emits a green light when it is excited by the blue light, and a second quantum dot QD2, which emits a red light when it is excited by the blue light.

The barrier layer CPL may be disposed on the color conversion layer CCL. The barrier layer CPL may prevent moisture and/or oxygen (from entering the color conversion layer CCL. The barrier layer CPL may cover the color conversion layer CCL.

The liquid crystal display panel DP may be disposed on the light source unit LU. The liquid crystal display panel DP may include a first substrate SUB1 and a second substrate SUB2 that are opposite to each other. The liquid crystal display panel DP may include a liquid crystal layer LCL, which is disposed between the first substrate SUB1 and the second substrate SUB2.

The liquid crystal display panel DP may be divided into a display region DA and a peripheral region NDA enclosing the display region DA. The display region DA may be a region used to display an image, and the peripheral region NDA may be a region adjacent to the display region in a plan view and not used to display an image. The liquid crystal display panel DP may include a plurality of pixels disposed in the display region.

Signal lines and a pixel circuit for pixels may be formed on one (hereinafter, an array substrate) of the first substrate SUB1 and the second substrate SUB2. The array substrate may be connected to a main circuit substrate through a chip-on-film (COF). A central control circuit, which controls the liquid crystal display panel DP, may be disposed on the main circuit substrate. The central control circuit may be a micro-processor. The chip in the COF may be a data driving circuit. A gate driving circuit may be mounted on the array substrate or may be integrated on the array substrate in the form of a low-temperature polysilicon (LTPS).

The liquid crystal layer LCL may include liquid crystals. In an embodiment, the liquid crystal layer LCL of the liquid crystal display panel DP may include vertically-aligned liquid crystals. The liquid crystals in the liquid crystal layer LCL may be vertically aligned with respect to the first substrate SUB1 or the second substrate SUB2. For example, the liquid crystals may be aligned to have an inclination angle of 88° to 90° relative to a top surface of the first substrate SUB1 or a bottom surface of the second substrate SUB2. Thus, the liquid crystal display panel DP may be a liquid crystal display panel of a vertical alignment mode.

In embodiments of the present inventive concept, various kinds of display panels, such as twisted nematic (TN) mode, horizontal alignment mode, super vertical alignment (SVA) mode, super patterned vertical alignment (S-PVA) mode, optically compensated bend (OCB) mode, and electrically controlled birefringence (ECB) mode display panels, may be used as the liquid crystal display panel DP of the display device DD. In addition, the liquid crystal display panel DP may differ from the afore-described panel in terms of an operating method of a display panel and an aligning method of liquid crystal molecules.

The liquid crystal display panel DP may include polarization layers POL-T and POL-B. For example, as shown in FIG. 3, the polarization layers POL-T and POL-B may include a bottom polarization layer POL-B disposed below the first substrate SUB1, which is a lower substrate of the liquid crystal display panel DP, and a top polarization layer POL-T disposed on the second substrate SUB2, which is an upper substrate of the liquid crystal display panel DP.

The polarization layers POL-T and POL-B may include a linear polarizer. The linear polarizer may convert an incident light to a linearly polarized light. The linear polarizer may be a film-type polarizer including an elongated polymer film. The elongated polymer film may be an elongated polyvinylalcohol-based film. In addition, the linear polarizer may be a coating-type polarization layer.

The polarization layers POL-T and POL-B may each independently be an in-cell type polarization layer disposed between the first substrate SUB1 and the liquid crystal layer LCL or between the second substrate SUB2 and the liquid crystal layer LCL.

For example, the bottom polarization layer POL-B may be a coating-type polarization layer or a polarization layer formed by a deposition process. The bottom polarization layer POL-B may be formed by coating a material, in which a dichroic dye and a liquid crystal compound are contained. In an embodiment, the bottom polarization layer POL-B may be a layer including a wire grid type polarizer. In embodiments, the bottom polarization layer POL-B may be of a film type and may be disposed below the liquid crystal display panel DP. In this case, an adhesive layer may be further disposed between the bottom polarization layer POL-B and the liquid crystal display panel DP.

The top polarization layer POL-T may also be a coating-type polarization layer or a polarization layer formed by a deposition process.

The linear polarizer in the top polarization layer POL-T on the second substrate SUB2 may have a transmission axis that is orthogonal to a transmission axis of the linear polarizer in the bottom polarization layer POL-B. The polarization layers POL-T and POL-B may further include a phase retarding layer, an optical compensation layer, or the like. The phase retarding layer, the optical compensation layer, or the like may be disposed on the top or bottom surface of the linear polarizer, and an adhesive layer may be further disposed between the linear polarizer and the phase retarding layer or between the linear polarizer and the optical compensation layer.

In the display device DD, the optical unit OU may be disposed on the liquid crystal display panel DP. The optical unit OU may include the optical film OF and the base film BS.

The optical film OF may be disposed on the liquid crystal display panel DP. The optical film OF may be disposed on the top polarization layer POL-T. In addition, an adhesive layer AD may be disposed between the top polarization layer POL-T and the optical film OF.

The base film BS may be disposed on the optical film OF. The base film BS may serve as a structure supporting and protecting the optical film OF. A polyethyleneterephthalate (PET) film or the like may be used for the base film BS.

The optical film OF may include a first pattern layer RP1 and a second pattern layer RP2. The second pattern layer RP2 may be disposed on the first pattern layer RP1. Referring to FIG. 5, the first pattern layer RP1 may include a plurality of protrusions EP, and a concave portion VP may be defined between adjacent ones of the protrusions EP. A groove that is defined by the protrusion EP and the concave portion VP of the first pattern layer RP1 may correspond to a step portion of the first pattern layer RP1. The second pattern layer RP2 may be disposed to cover the groove of the first pattern layer RP1 and to fill the concave portions VP. The second pattern layer RP2 may substantially fill the concave portions VP so that there is substantially no gap (e.g., no air) between the second pattern layer RP2 and the first pattern layer RP1.

The first and second pattern layers RP1 and RP2 may have refractive indices different from each other. In an embodiment, an absolute value of a difference in refractive index between the first and second pattern layers RP1 and RP2 may be greater than or equal to 0.1. For example, the absolute value of the difference in refractive index between the first and second pattern layers RP1 and RP2 may range from 0.2 to 0.25.

The first pattern layer RP1 may have a first refractive index that is smaller than a second refractive index of the second pattern layer RP2. In an embodiment, the refractive index of the second pattern layer RP2 may be smaller than the refractive index of the first pattern layer RP1. A refractive index of a low refractive pattern layer, which is one of the first and second pattern layers RP1 and RP2 and has a relatively low refractive index, may range from 1.0 to 1.47. A refractive index of a high refractive pattern layer, which is the other of the first and second pattern layers RP1 and RP2 and has a relatively high refractive index, may range from 1.57 to 1.7. The refractive index value of each pattern layer may be variously adjusted as long as a difference in refractive index between the first and second pattern layers RP1 and RP2 is maintained to be greater than or equal to 0.1.

The first pattern layer RP1 may include a base portion BL and a plurality of protrusions EP. The protrusions EP may be disposed on the base portion BL to be aligned to each other. In addition, the second pattern layer RP2 may be disposed on the first pattern layer RP1, and the second pattern layer RP2 may fill spaces between the protrusions EP.

In an embodiment, each of the protrusions EP may extend in a specific direction. The protrusions EP may form a stripe pattern on a plane defined by the first direction axis DR1 and the second direction axis DR2.

Referring to FIG. 5, each of the protrusions EP may extend parallel to the second direction axis DR2. Referring to FIGS. 1 to 5, the extension direction of the protrusions EP of the optical film OF may be a direction that is parallel to a vertical (i.e., up and down) direction, when viewed in a direction looking the display surface IS of the electronic device ED. That is, in the display device DD according to the embodiment shown in FIGS. 1 and 2, the extension direction of the protrusions EP of the optical film OF may be parallel to the short side of the display device DD.

FIG. 1 illustrates an example in which a horizontal (i.e., left and right) direction of the display surface IS of the electronic device ED is parallel to the long side and the vertical (i.e., up and down) direction is parallel to the short side. In an embodiment, when viewed in a direction in which a user looks at the electronic device ED, the horizontal (i.e., left and right) direction of the display surface IS of the electronic device ED may be parallel to the short side, and the vertical (i.e., up and down) direction may be parallel to the long side. In this case, the extension direction of the protrusions EP of the optical film OF may be parallel to the long side of the display device DD.

Referring to FIGS. 6 and 7, in the optical film OF according to an embodiment of the inventive concept, each of the protrusions EP may include a plurality of sub-protrusions SP1, SP2, SP3, . . . , SPn. Each of the protrusions EP may include n sub-protrusions SP1, SP2, SP3, . . . , SPn, where n is an integer of 2 or greater. For example, n may be an integer that is greater than or equal to 2 and is smaller than or equal to 10.

Each of the n sub-protrusions SP1, SP2, SP3, . . . , SPn may have a quadrilateral shape when viewed in a sectional view perpendicular to the base portion BL. Hereinafter, the sectional view perpendicular to the base portion BL may be taken to be parallel to a plane defined by the first direction axis DR1 and the third direction axis DR3.

The n sub-protrusions SP1, SP2, SP3, . . . , SPn may be sequentially stacked on the base portion BL. In an embodiment, the shape of each of the protrusions EP may be variously change, depending on the number of the stacked sub-protrusions SP1, SP2, SP3, . . . , SPn and the shape and size of each of the sub-protrusions SP1, SP2, SP3, . . . , SPn.

The n sub-protrusions SP1, SP2, SP3, . . . , SPn may respectively include bottom surfaces DS-S1, DS-S2, . . . , DS-Sn adjacent to the base portion BL, upper surfaces US-S1, US-S2, . . . , US-Sn opposite to the bottom surfaces DS-S1, DS-S2, . . . , DS-Sn, and side surfaces SS-S1, SS-S2, . . . , SS-Sn connecting the bottom surfaces DS-S1, DS-S2, . . . , DS-Sn to the upper surfaces US-S1, US-S2, . . . , US-Sn.

The bottom surface DS-S1 of the first sub-protrusion SP1, which is one of the n sub-protrusions SP1, SP2, SP3, . . . , SPn and is in contact with the base portion BL, may serve as a bottom surface DS of the protrusion EP. The upper surface US-Sn of the n-th sub-protrusion SPn, which is the uppermost one of the n sub-protrusions SP1, SP2, SP3, . . . , SPn, may serve as an upper surface US of the protrusion EP. In addition, a side surface SS of the protrusion EP may be defined by the side surfaces SS-S1, SS-S2, . . . , SS-Sn of the n sub-protrusions SP1, SP2, SP3, . . . , SPn and exposed surfaces ES-S1, ES-S2, . . . , ES-S(n−1), which are not covered by the stacked sub-protrusions. Meanwhile, the exposed surfaces ES-S1, ES-S2, . . . , ES-S(n−1) may not be overlapped with the stacked sub-protrusions and may be exposed to be in contact with the second pattern layer RP2.

In addition, each of the protrusions EP may include at least one step portion ST, which is formed near the side surface SS. The step portion ST may be defined by the n sub-protrusions SP1, SP2, SP3, . . . , SPn constituting the protrusion EP. That is, the side surface SS of the protrusion EP may include at least one step portion ST, and the step portion ST may be a portion that is defined by the exposed surfaces ES-S1, ES-S2, . . . , ES-S(n−1) and the side surfaces SS-S1, SS-S2, . . . , SS-Sn of the sub-protrusions.

For example, the step portion ST in the protrusion EP including the n sub-protrusions SP1, SP2, SP3, . . . , SPn may be defined by an exposed surface ES-Sm of an m-th sub-protrusion SPm and a side surface SS-S(m+1) of an (m+1)-th sub-protrusion SP(m+1). The exposed surface ES-Sm may be a portion of the upper surface US-Sm of the m-th sub-protrusion SPm, which is not overlapped with the (m+1)-th sub-protrusion SP(m+1). Here, m is an integer that is greater than or equal to 1 and is smaller than or equal to (n−1).

Furthermore, when a width of an upper surface of a lower sub-protrusion of the adjacently stacked sub-protrusions is equal to a width of a bottom surface of an upper sub-protrusion, the step portion ST may be defined by side surfaces of the adjacently stacked sub-protrusions.

In the protrusion EP including the n sub-protrusions SP1, SP2, SP3, . . . , SPn, the number of the step portions ST included in the side surface SS may be greater than or equal to 1 and may be smaller than or equal to (n−1). For example, when the protrusion EP includes the n sub-protrusions SP1, SP2, SP3, . . . , SPn, the maximum number of the step portions ST defined in the side surface SS of the protrusion EP may be (n−1).

In the n sub-protrusions SP1, SP2, SP3, . . . , SPn stacked in the thickness direction of the optical film OF (i.e., in the direction of the third direction axis DR3), widths of the upper surfaces US-S1, US-S2, . . . , US-Sn may decrease with increasing distance from the base portion BL. For example, as shown in FIG. 6, a width $W_{S2-U}$ of the second upper surface US-S2 of the second sub-protrusion SP2 may be smaller than a width $W_{S1-U}$ of the first upper surface US-S1 of the first sub-protrusion SP1.

In the present specification, a width of an element corresponds to the smallest length of the element measured in the direction parallel to the first direction axis DR1 in a sectional view, and a height of an element corresponds to the smallest length of the element measured in the direction parallel to the third direction axis DR3. In the present specification, the width may mean a width that is measured in a sectional view perpendicular to the base portion BL and is measured in a direction perpendicular to the extension direction of the protrusion EP.

The n sub-protrusions SP1, SP2, SP3, . . . , SPn, which are sequentially stacked in the thickness direction of the optical film OF (e.g., in a direction parallel to the third direction axis DR3), may have sectional areas decreasing with increasing distance from the base portion BL, when measured in a sectional view perpendicular to the base portion BL. That is, as a distance from the base portion BL increases in an upward direction, the sectional area of the sub-protrusion decrease, such that the step portion ST is defined in the side surface SS of the protrusion EP.

When viewed in a sectional view perpendicular to the base portion BL, the n sub-protrusions SP1, SP2, SP3, . . . , SPn may each independently have a rectangular or trapezoidal shape. For example, all of the n sub-protrusions SP1, SP2, SP3, . . . , SPn may have a rectangular section, or all of the n sub-protrusions SP1, SP2, SP3, . . . , SPn may have a trapezoidal section. In an embodiment, some of the n sub-protrusions SP1, SP2, SP3, . . . , SPn may have a trapezoidal section, and the others may have a rectangular section.

Inclination angles $\theta_{S1}$, $\theta_{S2}$, . . . , $\theta_n$ of the side surfaces SS-S1, SS-S2, . . . , SS-Sn of the n sub-protrusions SP1, SP2, SP3, . . . , SPn relative to the bottom surfaces DS-S1, DS-S2, . . . , DS-Sn may each independently range from 45° to 90°. In an embodiment, the inclination angles $\theta_{S1}$, $\theta_{S2}$, . . . , $\theta_n$ may each independently range from 60° to 90°.

When the inclination angle of each of the side surfaces SS-S1, SS-S2, . . . , SS-Sn of the sub-protrusions SP1, SP2, SP3, . . . , SPn relative to the respective bottom surfaces DS-S1, DS-S2, . . . , DS-Sn is between 45° and 90°, the sub-protrusions SP1, SP2, SP3, . . . , SPn may have a trapezoidal section. By contrast, when the inclination angle of each of the side surfaces SS-S1, SS-S2, . . . , SS-Sn of the sub-protrusions SP1, SP2, SP3, . . . , SPn relative to the respective bottom surfaces DS-S1, DS-S2, . . . , DS-Sn is 90°, the sub-protrusions SP1, SP2, SP3, . . . , SPn may have a rectangular section.

The side surfaces of the n sub-protrusions SP1, SP2, SP3, . . . , SPn may have inclination angles different from each other. For example, some of the stacked sub-protrusions may have a rectangular section, and in the case where the stacked sub-protrusions have trapezoidal sections, the trapezoidal shapes may be different from each other, due to different inclination angles of the side surfaces.

A ratio of a height Hu of the protrusion EP to a width $W_{S1-D}$ of the bottom surface DS of the protrusion EP may satisfy the condition given by the following mathematical formula 1.

$$0.3 \leq \text{(Height of Protruding portion)/(Width of Bottom surface of Protruding portion)} \leq 3.0 \quad \text{[Formula 1]}$$

In the Formula 1, the width of the bottom surface of the protrusion may be the smallest width of the bottom surface DS measured in a section perpendicular to the base portion BL, and the height of the protrusion may be the smallest distance between the bottom surface DS and the upper surface US measured in the section perpendicular to the base portion BL.

The width $W_{S1-D}$ of the bottom surface DS of the protrusion EP may range from 8 μm to 20 μm. The height Hu of the protrusion EP may range from 6 μm to 36 μm. A width $W_{Sn-U}$ of the upper surface US of the protrusion EP may range from 1 μm to 10 μm. The widths of the exposed surfaces ES-S1, ES-S2, . . . , ES-S(n−1) of the sub-protrusions and the lengths of the side surfaces SS-S1, SS-S2, . . . , SS-Sn may each independently range from 1 μm to 10 μm. The widths of the exposed surfaces ES-S1, ES-S2, . . . , ES-S(n−1) of the sub-protrusions may all be the same or may have at least two different values. In addition, the lengths of the side surfaces SS-S1, SS-S2, . . . , SS-Sn of the sub-protrusions may all be the same or may have at least two different values.

The protrusion EP may be a polygonal shape having eleven or more sides, when viewed in a section perpendicular to the base portion BL. The polygonal shape may be defined by the bottom and upper surfaces DS and US of the protrusion EP, the side surfaces SS-S1, SS-S2, . . . , SS-Sn of the sub-protrusions, and the exposed surfaces ES-S1, ES-S2, . . . , ES-S(n−1) of the sub-protrusions.

In the protrusions EP constituting the first pattern layer RP1, a distance $W_d$ between adjacent ones of the protrusions EP may range from 0 μm to 10 μm. When the distance $W_d$ between the adjacent ones of the protrusions EP is 0 μm, edges of adjacent ones of the first sub-protrusions SP1 may be in contact with each other.

Each of the protrusions EP may have a pattern of a symmetric shape. That is, the protrusion EP may have a symmetric shape with respect to an imaginary line RL, which passes through a center of the protrusion EP and extends in the thickness direction of the optical film OF or in the direction of the third direction axis DR3.

FIGS. 6 and 7 illustrate an example of the shapes of the optical film OF and the protrusion EP. For example, the shape of the optical film OF including the protrusion EP may be variously changed, depending on combination of the number, sizes, and shapes of the stacked sub-protrusions.

The optical film OF according to an embodiment may include the protrusion EP, which includes a plurality of sub-protrusions stacked in a thickness direction. Since at least one step portion ST, which is defined by the plurality of sub-protrusions, is included in the side surface SS, a degree of dispersion of light incident into the optical film OF may be improved. Accordingly, viewing angle characteristics of the display device may be improved.

FIG. 8 is a sectional view illustrating an optical film according to an embodiment of the inventive concept. Referring to FIG. 8, a first pattern layer RP1-1 may include the base portion BL and a protrusion EP-1, and the protrusion EP-1 may include n sub-protrusions SP1, SP2, SP3, . . . , SPn that are sequentially stacked in its thickness direction (e.g., in a direction parallel to the third direction axis DR3). In the first pattern layer RP1-1, the protrusion EP-1 may further include an edge protrusion SP-E disposed on an n-th sub-protrusion SPn. The edge protrusion SP-E may be in contact with the second pattern layer RP2. The edge protrusion SP-E may be the uppermost portion of the protrusion EP-1 and may have a triangular shape when viewed in a section perpendicular to the base portion BL.

In an optical film OF-1 according to an embodiment shown in FIG. 8, the base portion BL, the n sub-protrusions SP1, SP2, SP3, . . . , SPn, and the second pattern layer RP2 may have substantially the same features as those described with reference to FIGS. 5 to 7.

Hereinafter, an optical film according to an embodiment of the inventive concept will be described in more detail with reference to the sectional views of FIGS. 9 to 14. In the following description of the optical film, an element previously described with reference to FIGS. 1 to 8 may be identified by the same reference number without repeating an overlapping description thereof, for the sake of brevity.

Figure 9:
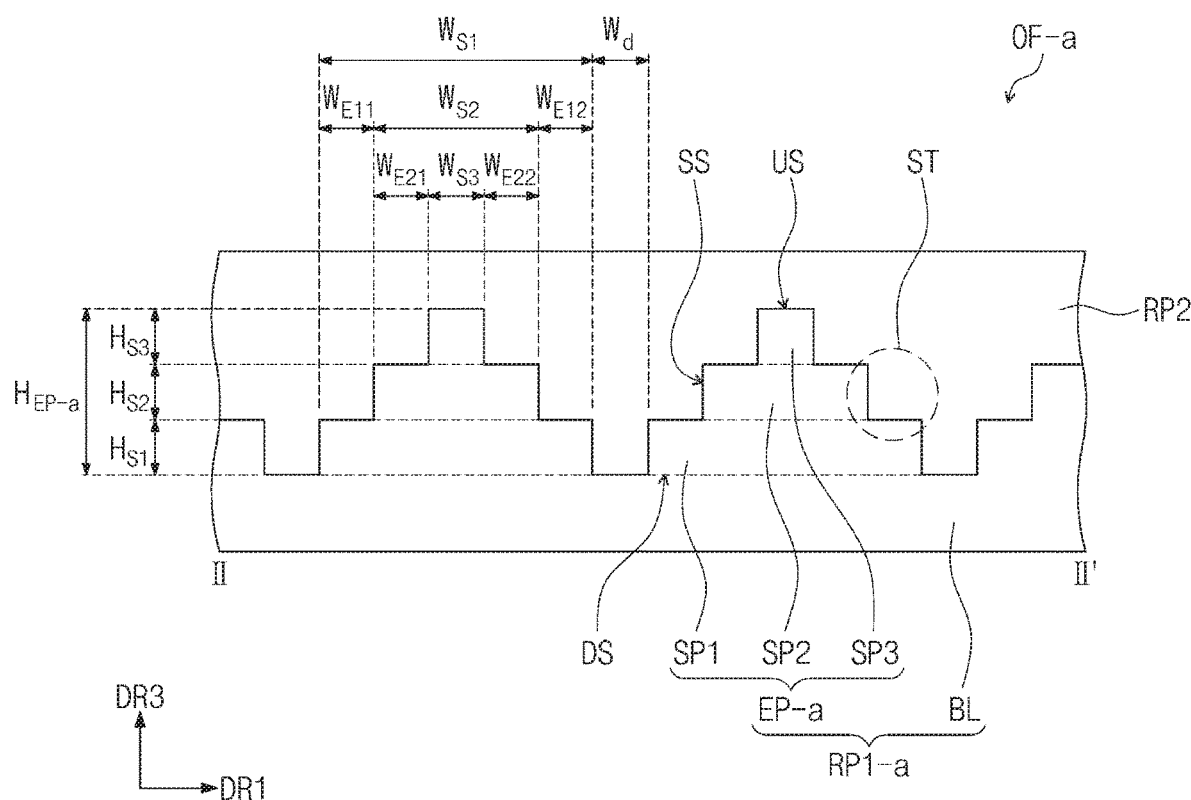
FIG. 9 is a sectional view illustrating a portion of an optical film according to an embodiment.
Figure 10:
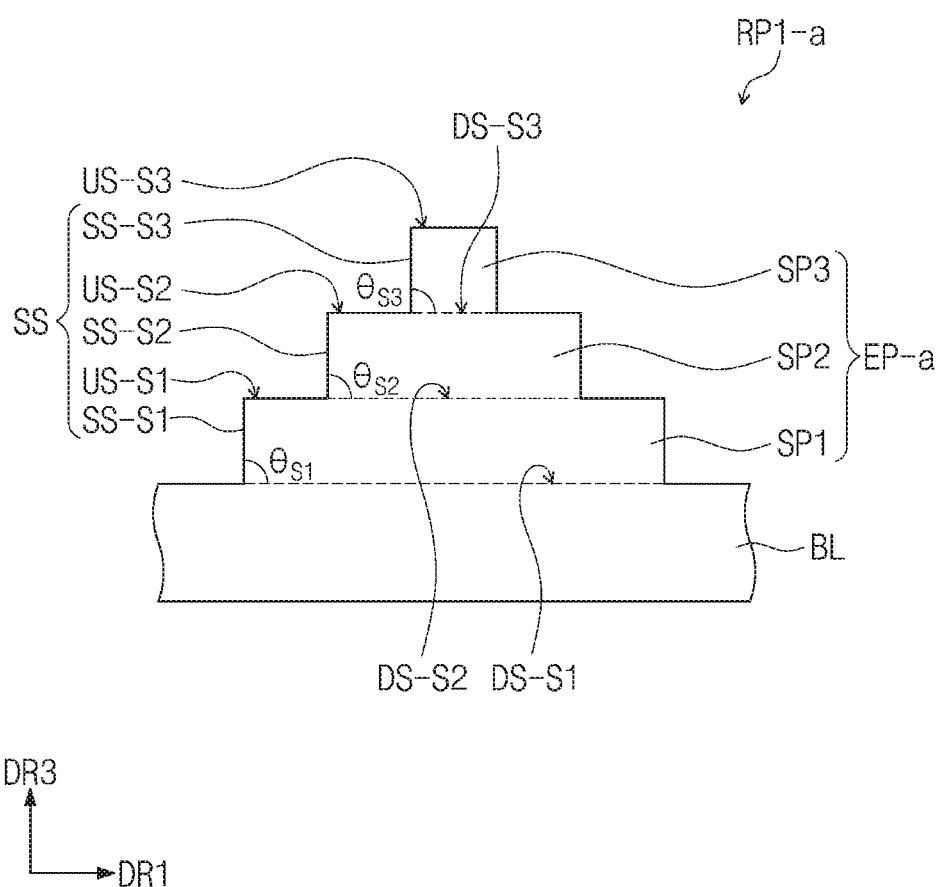
FIG. 10 is a sectional view illustrating a shape of a protrusion of an optical film according to an embodiment.

FIG. 9 may be a sectional view illustrating a portion corresponding to a line II-II' of FIG. 5. Referring to FIGS. 9 and 10, an optical film OF-a may include the base portion BL and protrusions EP-a, and each of the protrusions EP-a may include three sub-protrusions SP1, SP2, and SP3, which are sequentially stacked in its thickness direction (e.g., in a direction parallel to the third direction axis DR3).

The protrusion EP-a may include a first sub-protrusion SP1 adjacent to the base portion BL and having a first quadrilateral shape, a second sub-protrusion SP2 stacked on the first sub-protrusion SP1 and having a second quadrilateral shape, and a third sub-protrusion SP3 adjacent to the second pattern layer RP2 and having a third quadrilateral shape.

The first sub-protrusion SP1 may include a first bottom surface DS-S1 adjacent to the base portion BL, a first upper surface US-S1 opposite to the first bottom surface DS-S1, and a first side surface SS-S1 connecting the first bottom surface DS-S1 to the first upper surface US-S1. The second sub-protrusion SP2 may include a second bottom surface DS-S2 in contact with the first sub-protrusion SP1, a second upper surface US-S2 opposite to the second bottom surface DS-S2, and a second side surface SS-S2 connecting the second bottom surface DS-S2 to the second upper surface US-S2. A portion of the first upper surface US-S1 may be overlapped with the second bottom surface DS-S2 of the second sub-protrusion SP2, and the remaining portion of the first upper surface US-S1 may not be overlapped with the second sub-protrusion SP2 and may be exposed. The exposed portion of the first upper surface US-S1 may be in contact with the second pattern layer RP2. Meanwhile, the exposed portion of the first upper surface US-S1 may correspond to the exposed surface ES-S1 (e.g., see FIG. 6).

The third sub-protrusion SP3 may include a third bottom surface DS-S3 in contact with the second sub-protrusion SP2, a third upper surface US-S3 opposite to the third bottom surface DS-S3, and a third side surface SS-S3 connecting the third bottom surface DS-S3 to the third upper surface US-S3. A portion of the second upper surface US-S2 may overlap with the third bottom surface DS-S3 of the third sub-protrusion SP3, and the remaining portion of the second upper surface US-S2 may not overlap with the third sub-protrusion SP3 and may be exposed. The exposed portion of the second upper surface US-S2 may be in contact with the second pattern layer RP2.

At least one step portion ST, which is defined in a side surface of the protrusion EP-a, may be defined by a plurality of sub-protrusions SP1, SP2, and SP3 which are stacked. For example, the step portion ST may be a portion that is defined by the exposed portion of the first upper surface US-S1 and the second side surface SS-S2 of the second sub-protrusion SP2 or is defined by the exposed portion of the second upper surface US-S2 and the third side surface SS-S3 of the third sub-protrusion SP3.

In the optical film OF-a of FIGS. 9 and 10, the first to third sub-protrusions SP1, SP2, and SP3 may have a rectangular shape when viewed in a section perpendicular to the base portion BL. That is, inclination angles $\theta_{S1}$, $\theta_{S2}$, and $\theta_{S3}$ of the first to third side surfaces SS-S1, SS-S2, and SS-S3 of the first to third sub-protrusions SP1, SP2, and SP3 relative to the first to third bottom surfaces DS-S1, DS-S2, and DS-S3 may be 90°.

The first sub-protrusion SP1 may have a rectangular shape having a width $W_{S1}$ and a height $H_{S1}$, the second sub-protrusion SP2 may have a rectangular shape having a width $W_{S2}$ and a height $H_{S2}$, and the third sub-protrusion SP3 may have a rectangular shape having a width $W_{S3}$ and a height $H_{S3}$. The width $W_{S2}$ of the second sub-protrusion SP2 may be smaller than the width $W_{S1}$ of the first sub-protrusion SP1, and the width $W_{S3}$ of the third sub-protrusion SP3 may be smaller than the width $W_{S2}$ of the second sub-protrusion SP2.

The width $W_{S1}$ of the first sub-protrusion SP1 may correspond to a width of the bottom surface DS of the protrusion EP-a, and the width $W_{S3}$ of the third sub-protrusion SP3 may correspond to a width of the upper surface US of the protrusion EP-a. The height $H_{EP-a}$ of the protrusion EP-a may correspond to a sum of the heights $H_{S1}$, $H_{S2}$, and $H_{S1}$ of the first to third sub-protrusions SP1, SP2, and SP3.

In addition, each of widths $W_{E11}$ and $W_{E12}$ of the exposed portions of the first upper surface US-S1 of the first sub-protrusion SP1 and widths $W_{E21}$ and $W_{E22}$ of the exposed portions of the second upper surface US-S2 of the second sub-protrusion SP2 may range from 1 μm to 10 μm. The heights $H_{S1}$, $H_{S2}$, and $H_{S3}$ of the first to third sub-protrusions SP1, SP2, and SP3 may each independently range from 1 μm to 10 μm. The heights $H_{S1}$, $H_{S2}$, and $H_{S3}$ of the first to third sub-protrusions SP1, SP2, and SP3 may be all the same or may have at least two different values. A sum of the heights $H_{S1}$, $H_{S2}$, and $H_{S3}$ of the first to third sub-protrusions SP1, SP2, and SP3 may correspond to the height $H_{EP-a}$ of the protrusion EP-a.

In the protrusions EP, a distance $W_d$ between adjacent protrusions EP may be greater than 0 μm and may be smaller than or equal to 10 μm.

Figure 11:
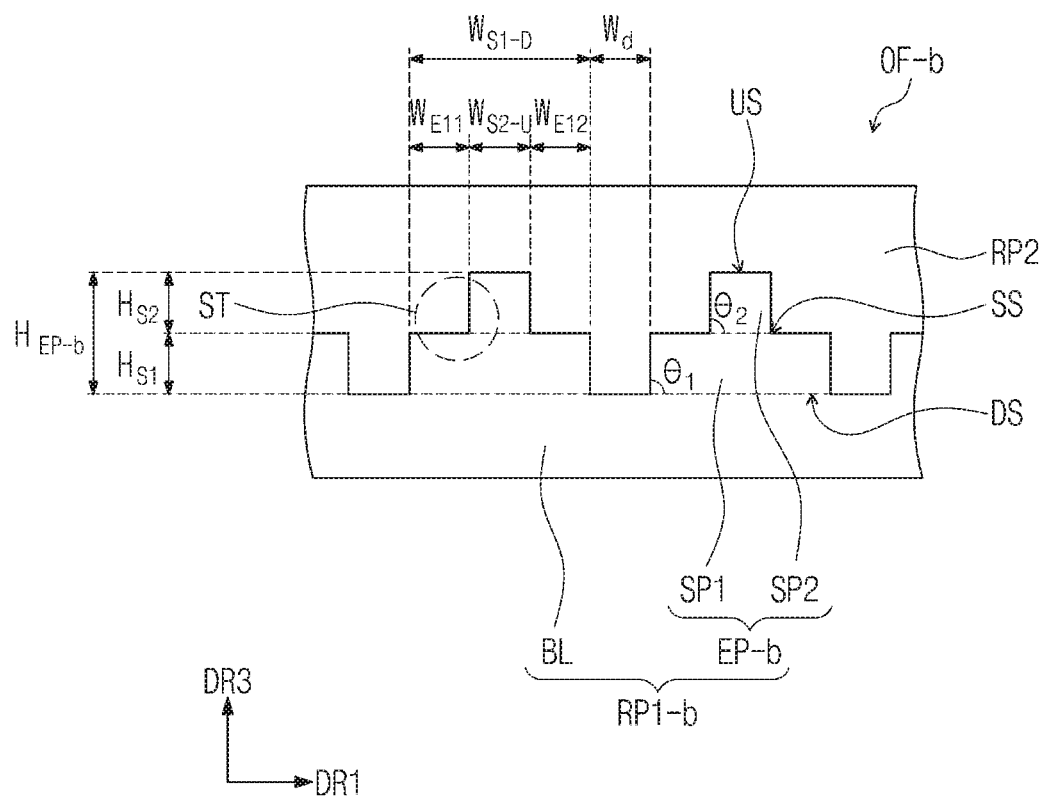
FIG. 11 is a sectional view illustrating a portion of an optical film according to an embodiment.

FIG. 11 is a sectional view illustrating an optical film OF-b according to an embodiment of the inventive concept. The optical film OF-b of FIG. 11 may have a protrusion EP-b of a first pattern layer RP1-b that includes two sub-protrusions SP1 and SP2.

That is, the optical film OF-b according to an embodiment of the inventive concept may include the first pattern layer RP1-b and the second pattern layer RP2 which have refractive indices different from each other, and the second pattern layer RP2 may be disposed on the first pattern layer RP1-b. The first pattern layer RP1-b may include the base portion BL and the protrusions EP-b disposed on the base portion BL, and each of the protrusions EP-b may include the first sub-protrusion SP1 and the second sub-protrusion SP2. When measured in a section perpendicular to the base portion BL, the first and second sub-protrusions SP1 and SP2 may have side surfaces that are each independently inclined at inclination angles $\theta_{S1}$ and $\theta_{S2}$, which range from 45° to 90°, relative to the base portion BL. For example, the inclination angles $\theta_{S1}$ and $\theta_{S2}$ may range from 60° to 90°. That is, the protrusion EP-b of the first pattern layer RP1-b may include two sub-protrusions SP1 and SP2, each of which has a rectangular or trapezoidal shape when viewed in a section perpendicular to the base portion BL. The second sub-protrusion SP2 may have a smaller sectional area than the first sub-protrusion SP1, and a width of the second sub-protrusion SP2 may be smaller than a width of the first sub-protrusion SP1. Thus, the step portion ST may be formed in the side surface of the protrusion EP-b. Each of the first sub-protrusion SP1 and the second sub-protrusion SP2 may include a bottom surface, an upper surface opposite to the bottom surface, and a side surface connecting the bottom surface to the upper surface.

Figure 12:
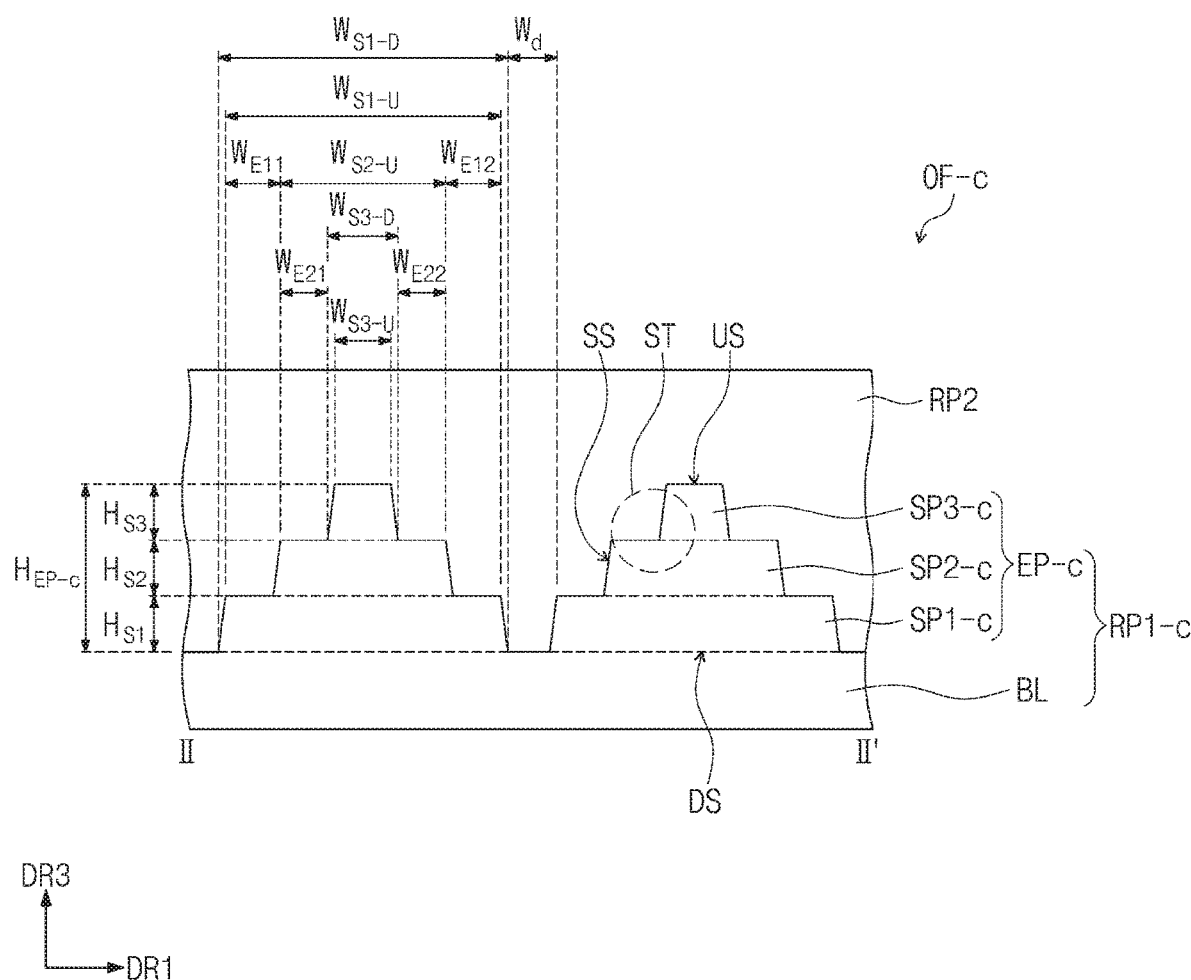
FIG. 12 is a sectional view illustrating a portion of an optical film according to an embodiment.
Figure 13:
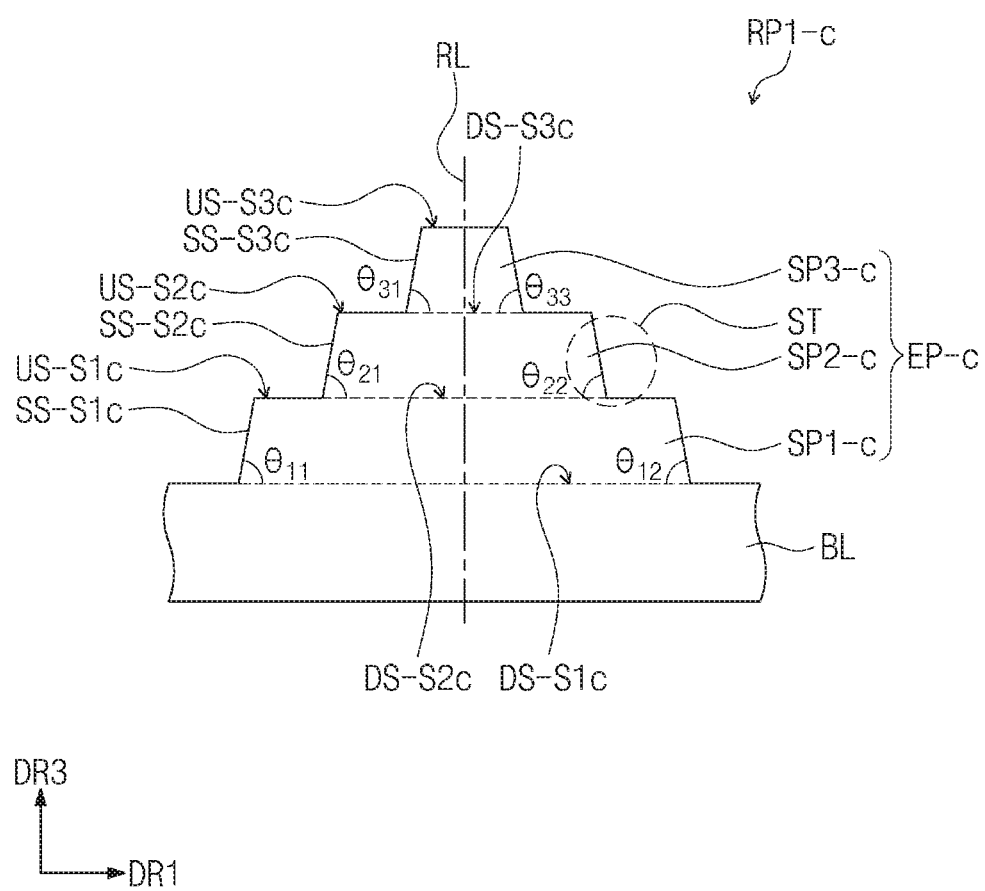
FIG. 13 is a sectional view illustrating a shape of a protrusion of an optical film according to an embodiment.

FIG. 12 is a sectional view illustrating an optical film according to an embodiment of the inventive concept, and FIG. 13 is a sectional view illustrating a first pattern layer, which is included in an optical film according to an embodiment of the inventive concept.

An optical film OF-c according to an embodiment of the inventive concept may include a first pattern layer RP1-c and the second pattern layer RP2, which have refractive indices different from each other. The first pattern layer RP1-c may include the base portion BL and a plurality of protrusions EP-c disposed on the base portion BL.

Each of the protrusions EP-c may include three sub-protrusions SP1-c, SP2-c, and SP3-c, which are sequentially stacked in its thickness direction (e.g., in a direction parallel to the third direction axis DR3).

The protrusion EP-c may include a first sub-protrusion SP1-c, which is adjacent to the base portion BL and has a first trapezoidal shape, a second sub-protrusion SP2-c, which is stacked on the first sub-protrusion SP1-c and has a second trapezoidal shape, and a third sub-protrusion SP3-c, which is disposed adjacent to the second pattern layer RP2 and has a third trapezoidal shape.

Inclination angles $\theta_{11}$, $\theta_{12}$, $\theta_{21}$, $\theta_{22}$, $\theta_{31}$, and $\theta_{32}$ of first to third side surfaces SS-S1c, SS-S2c, and SS-S3c of the first to third sub-protrusions SP1-c, SP2-c, and SP3-c relative to first to third bottom surfaces DS-S1c, DS-S2c, and DS-S3c may each independently range from 45° to 90°. For example, the inclination angles $\theta_{11}$, $\theta_{12}$, $\theta_{21}$, $\theta_{22}$, $\theta_{31}$, and $\theta_{32}$ may each independently range from 60° to 90°.

The inclination angles $\theta_{11}$ and $\theta_{12}$ of the first side surface SS-S1c of the first sub-protrusion SP1-c, the inclination angles $\theta_{21}$ and $\theta_{22}$ of the second side surface SS-S2c of the second sub-protrusion SP2-c, and the inclination angles $\theta_{31}$ and $\theta_{32}$ of the third side surface SS-S3c of the third sub-protrusion SP3-c may be all the same. In an embodiment, at least one of the inclination angles $\theta_{11}$ and $\theta_{12}$ of the first side surface SS-S1c of the first sub-protrusion SP1-c, the inclination angles $\theta_{21}$ and $\theta_{22}$ of the second side surface SS-S2c of the second sub-protrusion SP2-c, and the inclination angles $\theta_{31}$ and $\theta_{32}$ of the third side surface SS-S3c of the third sub-protrusion SP3-c may be different from the remaining inclination angles.

The width $W_{S1-D}$ of the bottom surface DS-S1c of the first sub-protrusion SP1-c may correspond to a width of the bottom surface DS of the protrusion EP-c, and a width $W_{S3-U}$ of an upper surface US-S3c of the third sub-protrusion SP3-c may correspond to a width of the upper surface US of the protrusion EP-c.

The width $W_{S2-U}$ of the second upper surface US-S2c of the second sub-protrusion SP2-c may be smaller than the width $W_{S1-U}$ of the first upper surface US-S1c of the first sub-protrusion SP1-c, and the width $W_{S3-U}$ of the third upper surface US-S3c of the third sub-protrusion SP3-c may be smaller than the width $W_{S2-U}$ of the second upper surface US-S2c of the second sub-protrusion SP2-c. That is, the three sub-protrusions SP1-c, SP2-c, and SP3-c included in the protrusion EP-c may have sectional areas decreasing with increasing distance from the base portion BL and may have a decreasing width in an upward direction toward the upper surface in a section view. Thus, the step portion ST may be formed in the side surface of the protrusion EP-c.

Figure 14:
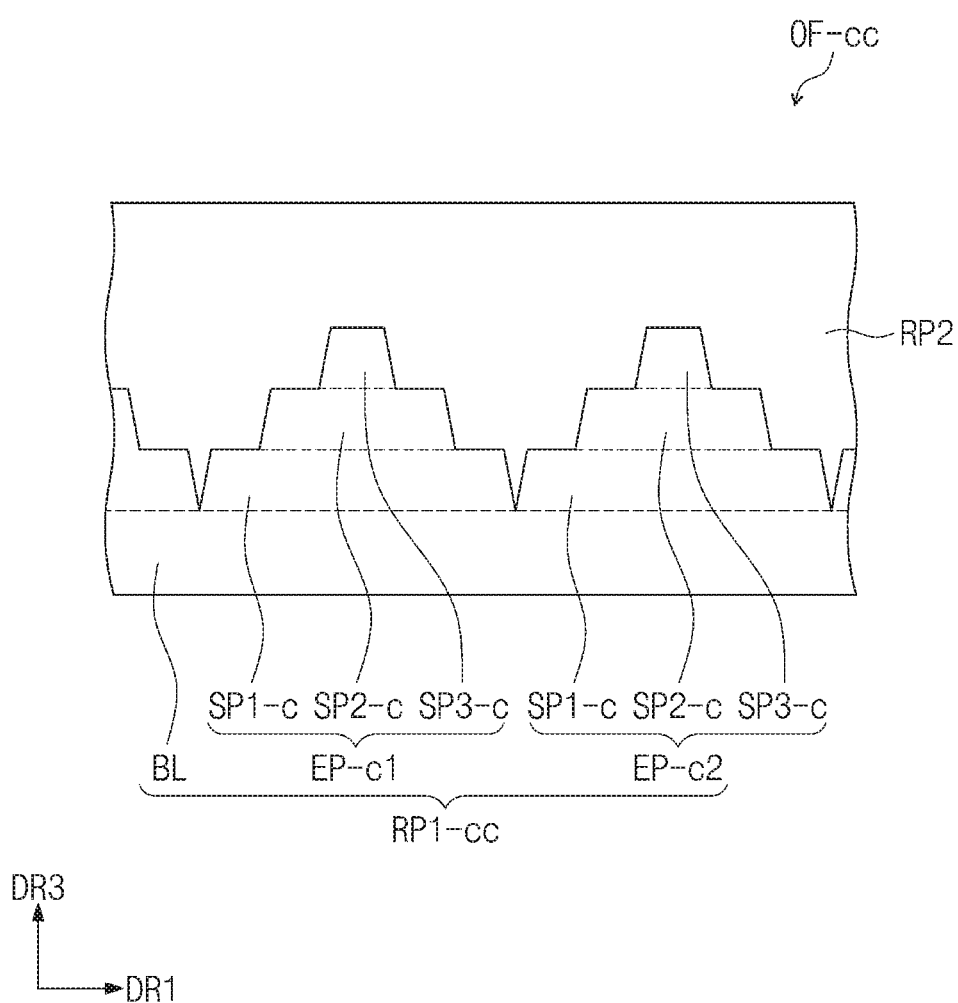
FIG. 14 is a sectional view illustrating a portion of an optical film according to an embodiment.
Figure 15:
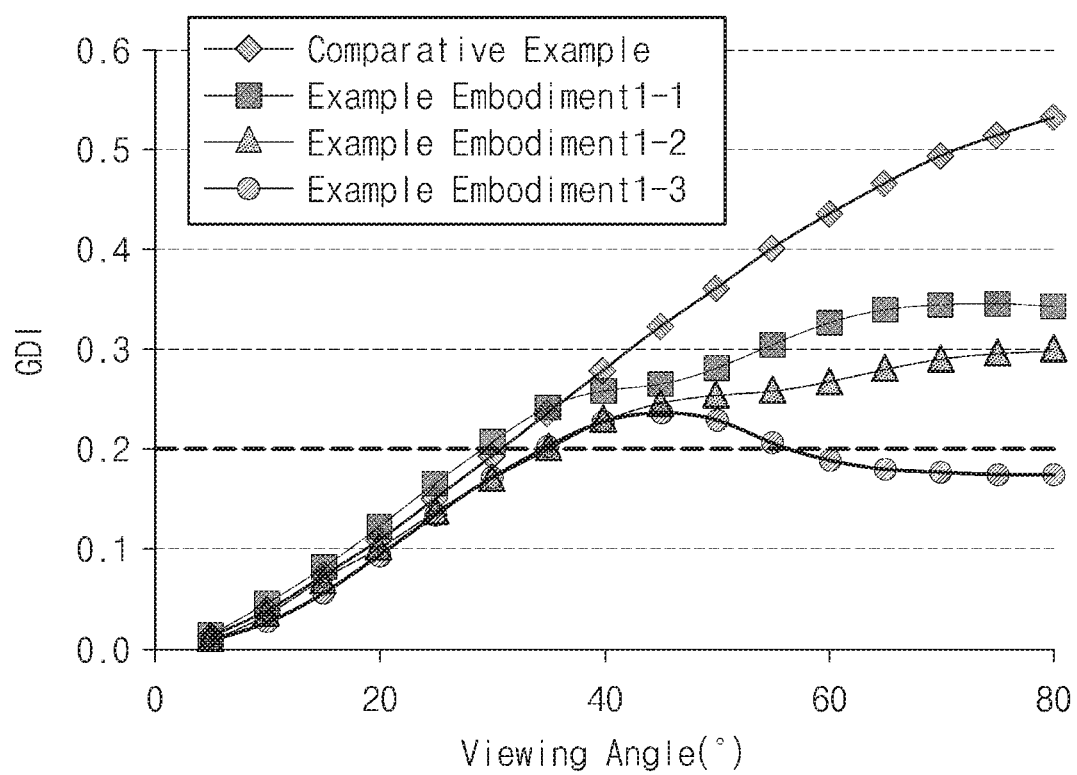
FIG. 15 is a graph showing viewing angle characteristics of display devices according to embodiments and comparative examples.
Figure 16:
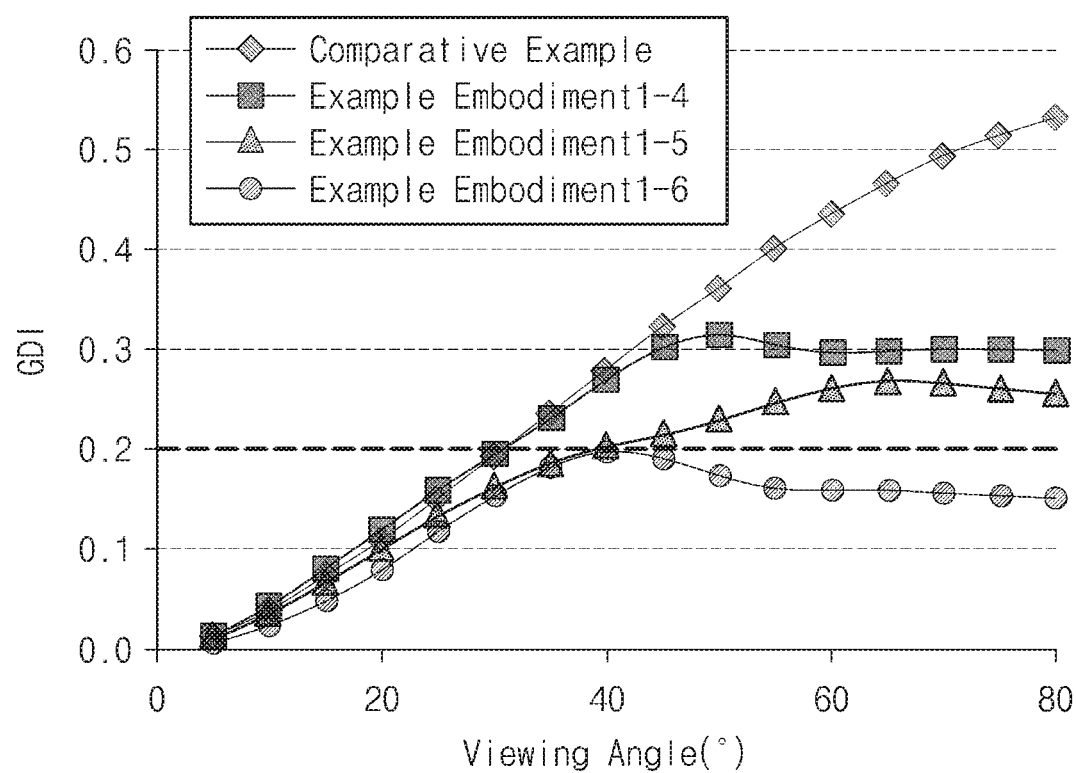
FIG. 16 is a graph showing viewing angle characteristics of display devices according to embodiments and comparative examples.
Figure 17:
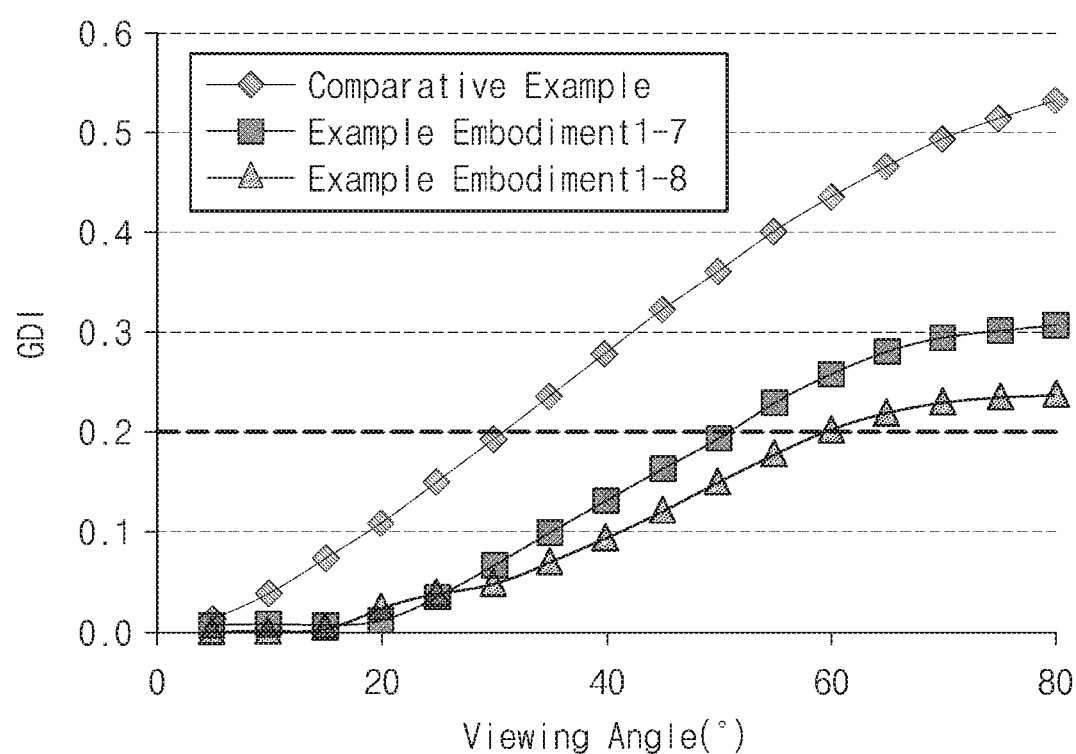
FIG. 17 is a graph showing viewing angle characteristics of display devices according to embodiments and comparative examples.
Figure 18:
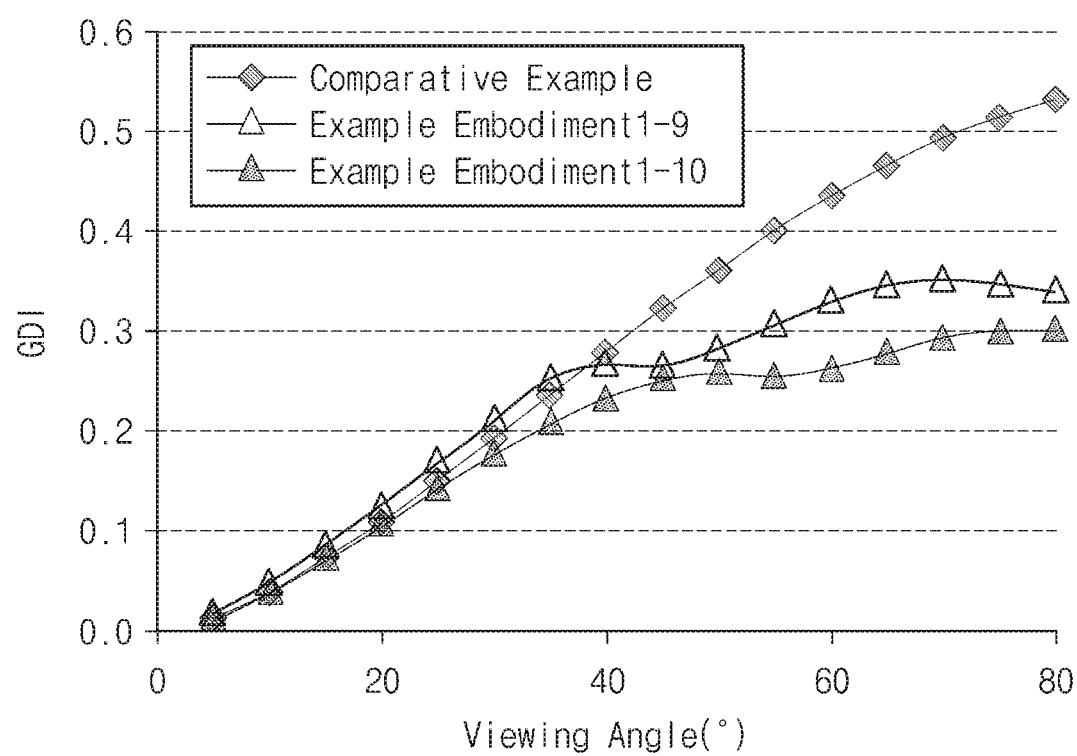
FIG. 18 is a graph showing viewing angle characteristics of display devices according to embodiments and comparative examples.

FIG. 14 is a sectional view illustrating an optical film according to an embodiment of the inventive concept. Referring to FIG. 14, an optical film OF-cc according to an embodiment of the inventive concept may include the base portion BL and a plurality of protrusions EP-c1 and EP-c2 disposed on the base portion BL. Each of the protrusions EP-c1 and EP-c2 may include three sub-protrusions SP1-c, SP2-c, and SP3-c.

Two adjacent ones of the protrusions EP-c1 and EP-c2 may not be spaced apart from each other, and for example, an edge of the first protrusion EP-c1 may be in contact with an opposite edge of the second protrusion EP-c2. For example, an edge of the first sub-protrusion SP1-c included in the first protrusion EP-c1 may be in contact with an opposite edge of the first sub-protrusion SP1-c included in the second protrusion EP-c2. That is, a distance between protrusions EP-c1 and EP-c2 adjacent to each other may be 0.

FIGS. 15 to 18 and Table 1 show measurement data of viewing angle characteristics of display devices, in which optical films according to embodiments of the inventive concept are included, as well as a display device according to a example. In Table 1, the white light brightness values, 30° gamma distortion Index (GDI) values, 60° GDI values in the comparative and example embodiments are comparatively summarized. The 30° and 60° GDI values represent 30° and 60° lateral viewing angle characteristics, respectively.

The example embodiments 1-1 and 1-4 in FIGS. 15 to 18 and Table 1 show data measured from display devices including the afore-described optical film according to an embodiment of FIG. 9, and the example embodiments 1-2, 1-3, 1-5, 1-6, and 1-7 show data measured from display devices including the afore-described optical film according to an embodiment of FIG. 12. In addition, the example embodiments 1-9 and 1-10 show data measured from display devices including the afore-described optical film according to an embodiment of FIG. 11. Meanwhile, the comparative example show data measured from a display device, in which the optical film was not included, and which was fabricated to have the same structure as the display device of FIG. 3, except for the absence of the optical unit OU.

In addition, the comparative example A show data measured from a display device including an optical film, in which a protrusion composed of a single sub-protrusion is included. In the comparative example A, the sub-protrusion had a trapezoidal section, and the inclination angle of the side surface was 86°. In addition, the width of the bottom surface of the sub-protrusion was 20 µm, the distance between adjacent ones of the protrusions was 5 µm, and the height of the protrusion was 10 µm.

In the example embodiments 1-1 to 1-6, 1-9 and 1-10, the first pattern layer had a refractive index higher than a refractive index of the second pattern layer, and in the example embodiments 1-7 and 1-8, the second pattern layer had a refractive index higher than a refractive index of the first pattern layer.

In the cases of the optical films in the example embodiments 1-1 and 1-4, the width $W_{S1}$ of the bottom surface of the first sub-protrusion was 20 µm, the distance $W_d$ between adjacent ones of the protrusions was 4 µm, and the height $H_{EP-a}$ of the protrusion was 12 µm. In addition, the width $W_{S3}$ of the upper surface of the third sub-protrusion, all of the widths $W_{E11}$, $W_{E12}$, $W_{E21}$, and $W_{E22}$ of the exposed portions of the first and second upper surfaces were 4 µm, and each of the heights $H_{S1}$, $H_{S2}$, and $H_{S1}$ of the sub-protrusions were 4 µm.

In the cases of the optical films in the example embodiments 1-2 and 1-5, the width $W_{S1-D}$ of the bottom surface of the first sub-protrusion was 20 µm, the distance $W_d$ between adjacent ones of the protrusions was 4 µm, and the height $H_{EP-c}$ of the protrusion was 12 µm. In addition, the width $W_{S3}$ of the upper surface of the third sub-protrusion was 3 µm, and all of the widths $W_{E11}$, $W_{E12}$, $W_{E21}$, $W_{E22}$ of the exposed portions of the first and second upper surfaces were 3.5 µm.

In the cases of the optical films in the example embodiments 1-3 and 1-6 to 1-8, the width $W_{S1-D}$ of the bottom surface of the first sub-protrusion was 20 µm, the distance $W_d$ between adjacent ones of the protrusions was 4 µm, and the height $H_{EP-c}$ of the protrusion was 12 µm. In addition, the width $W_{S3}$ of the upper surface of the third sub-protrusion was 2 µm, and all of the widths $W_{E11}$, $W_{E12}$, $W_{E21}$, $W_{E22}$ of the exposed portions of the first and second upper surfaces were 3 µm.

In the case of the optical film in the example embodiment 1-9, the width $W_{S1-D}$ of the bottom surface of the first sub-protrusion was 20 µm, the distance $W_d$ between adjacent ones of the protrusions was 4 µm, and the height $H_{EP-b}$ of the protrusion was 12 µm. In addition, the width $W_{S2-U}$ of the upper surface of the second sub-protrusion was 6 µm, and all of the widths $W_{E11}$ and $W_{E12}$ of the exposed portion of the first upper surface were 6 µm. The inclination angles of the side surfaces of the sub-protrusions were 90°. In the case of the optical film in the example embodiment 1-10, the width $W_{S1-D}$ of the bottom surface of the first sub-protrusion was 20 µm, the distance $W_d$ between adjacent ones of the protrusions was 4 µm, and the height $H_{EP-b}$ of the protrusion was 12 µm. In addition, the width $W_{S2-U}$ of the upper surface of the second sub-protrusion was 4.5 µm, and all of the widths $W_{E11}$ and $W_{E12}$ of the exposed portion of the first upper surface were 5.25 µm. The inclination angle of the side surfaces of the sub-protrusions was 83°.

TABLE 1

| Embodiments | Refractive index of first pattern layer | Refractive index of second pattern layer | Inclination angles of side surfaces of sub-protrusions | White light brightness (nit) | 30° GDI | 60° GDI |
|---|---|---|---|---|---|---|
| Comparative example | — | — | — | 368 | 0.192 | 0.435 |
| Comparative example A | 1.57 | 1.44 | 86° | 351 | 0.183 | 0.327 |

TABLE 1-continued

| Embodiments | Refractive index of first pattern layer | Refractive index of second pattern layer | Inclination angles of side surfaces of sub-protrusions | White light brightness (nit) | 30° GDI | 60° GDI |
|---|---|---|---|---|---|---|
| Example Embodiment 1-1 | 1.60 | 1.47 | 90°/90°/90° | 353 | 0.270 | 0.326 |
| Example Embodiment 1-2 | 1.60 | 1.47 | 83°/83°/83° | 347 | 0.172 | 0.268 |
| Example Embodiment 1-3 | 1.60 | 1.47 | 76°/76°/76° | 346 | 0.172 | 0.190 |
| Example Embodiment 1-4 | 1.60 | 1.40 | 90°/90°/90° | 354 | 0.196 | 0.297 |
| Example Embodiment 1-5 | 1.60 | 1.40 | 83°/83°/83° | 345 | 0.162 | 0.261 |
| Example Embodiment 1-6 | 1.60 | 1.40 | 76°/76°/76° | 338 | 0.155 | 0.159 |
| Example Embodiment 1-7 | 1.47 | 1.60 | 76°/76°/76° | 302 | 0.067 | 0.259 |
| Example Embodiment 1-8 | 1.40 | 1.60 | 76°/76°/76° | 312 | 0.050 | 0.203 |
| Example Embodiment 1-9 | 1.60 | 1.47 | 90°/90° | 353 | 0.211 | 0.329 |
| Example Embodiment 1-10 | 1.60 | 1.47 | 83°/83° | 347 | 0.176 | 0.262 |

Table 1 shows that the example embodiments 1-1 to 1-10 had improved GDI values in a direction of a viewing angle of 60°, compared with the comparative example, in which the optical film is included. In addition, the 30° GDI values in a direction of a viewing angle of 30° had equivalent or improved values, compared with the comparative example. Furthermore, the example embodiments 1-1 to 1-10 had equivalent or improved 60° GDI values, compared with the comparative example A including a single sub-protrusion. That is, these results show that, if a display device is configured to include one of the optical films described with reference to FIGS. 6 to 14, a display quality in a lateral direction can be improved, compared with the comparative example.

Furthermore, as shown in the graphs of FIGS. 15 to 18, the GDI values in a direction of a lateral viewing angle of 40° or greater were better in the example embodiments than in the comparative example.

FIGS. 19, 20, 23, and 24 are sectional views illustrating optical films according to some embodiments of the inventive concept. In the following description of the optical film, an element previously described with reference to FIGS. 1 to 14 will be identified by the same reference number without repeating an overlapping description thereof.

Figure 19:
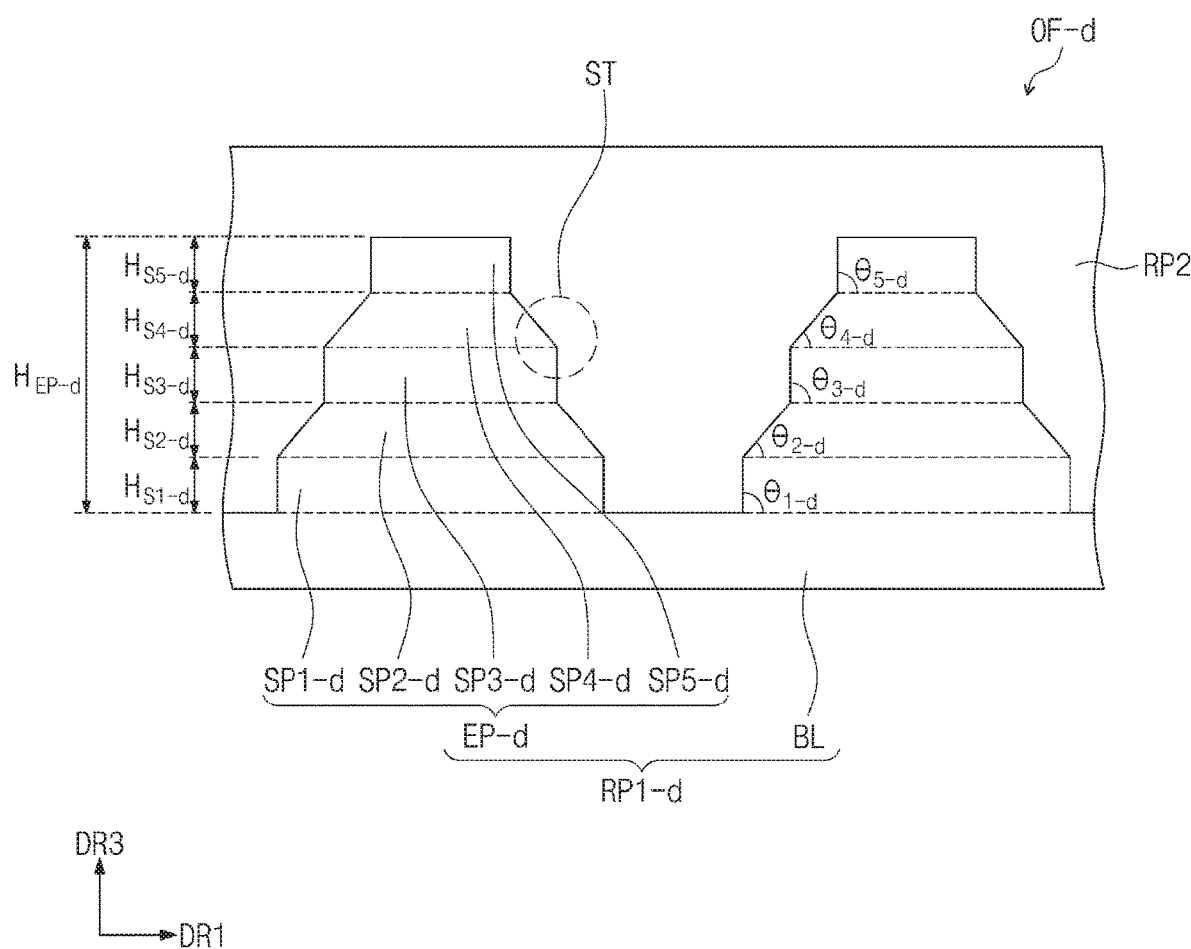
FIG. 19 is a sectional view illustrating a portion of an optical film according to an embodiment.
Figure 20:
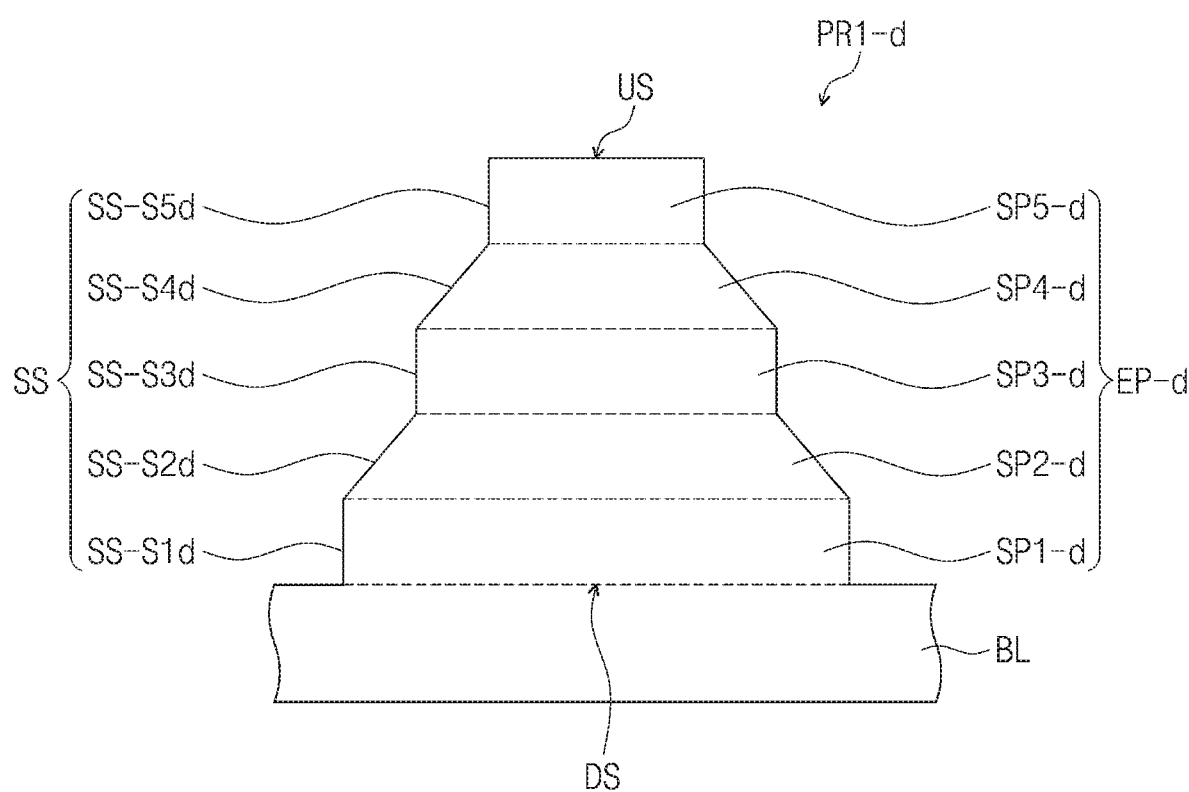
FIG. 20 is a sectional view illustrating a shape of a protrusion of an optical film according to an embodiment.

FIG. 19 is a sectional view illustrating an optical film according to an embodiment of the inventive concept, and FIG. 20 is a sectional view illustrating a portion of a first pattern layer, which is included in an optical film according to an embodiment of the inventive concept.

Referring to FIGS. 19 and 20, an optical film OF-d according to an embodiment of the inventive concept may include a first pattern layer RP1-d and the second pattern layer RP2, which have refractive indices different from each other, and the first pattern layer RP1-d may include a plurality of protrusions EP-d. Each of the protrusions EP-d may include a plurality of sub-protrusions SP1-d, SP2-d, SP3-d, SP4-d, and SP5-d.

The side surface SS of the protrusion EP-d may be defined by side surfaces SS-S1d, SS-S2d, SS-S3d, SS-S4d, and SS-S5d of the sub-protrusions SP1-d, SP2-d, SP3-d, SP4-d, and SP5-d.

When viewed in a section perpendicular to the base portion BL, the optical film OF-d may include sub-protrusions SP1-d, SP3-d, and SP5-d, which have a rectangular shape, and sub-protrusions SP2-d and SP4-d, which have a trapezoidal shape. For example, inclination angles $\theta_{1-d}$, $\theta_{3-d}$, and $\theta_{5-d}$ of the side surfaces SS-S1d, SS-S3d, and SS-S5d of the first sub-protrusion SP1-d, the third sub-protrusion SP3-d, and the fifth sub-protrusion SP5-d relative to the bottom surface DS may be 90°. In addition, inclination angles $\theta_{2-d}$ and $\theta_{4-d}$ of the side surfaces SS-S2d and SS-S4d of the second sub-protrusion SP2-d and the fourth sub-protrusion SP4-d relative to the bottom surface DS may be greater than or equal to 45° and may be smaller than 90°. In the optical film OF-d shown in FIGS. 19 and 20, the step portion ST included in the side surface SS of the protrusion EP-d may be defined by side surfaces of adjacently-stacked sub-protrusions.

FIGS. 19 and 20 illustrate the protrusion EP-d including five sub-protrusions SP1-d, SP2-d, SP3-d, SP4-d, and SP5-d, and each of the sub-protrusions have rectangular, trapezoidal, rectangular, trapezoidal, and rectangular shapes, respectively. For example, the number of the stacked sub-protrusions may be three or four or may be greater than 5. In addition, the inventive concept is not limited to the stacking order shown in FIGS. 19 and 20.

Figure 21:
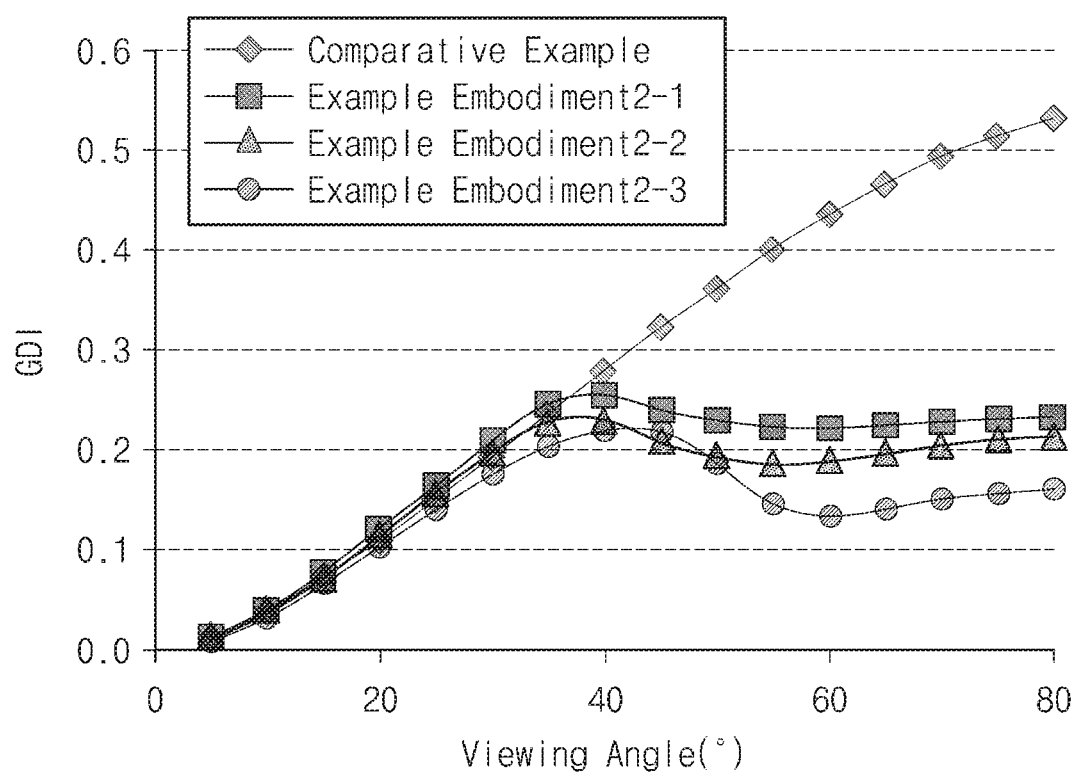
FIG. 21 is a graph showing viewing angle characteristics of display devices according to embodiments and comparative examples.
Figure 22:
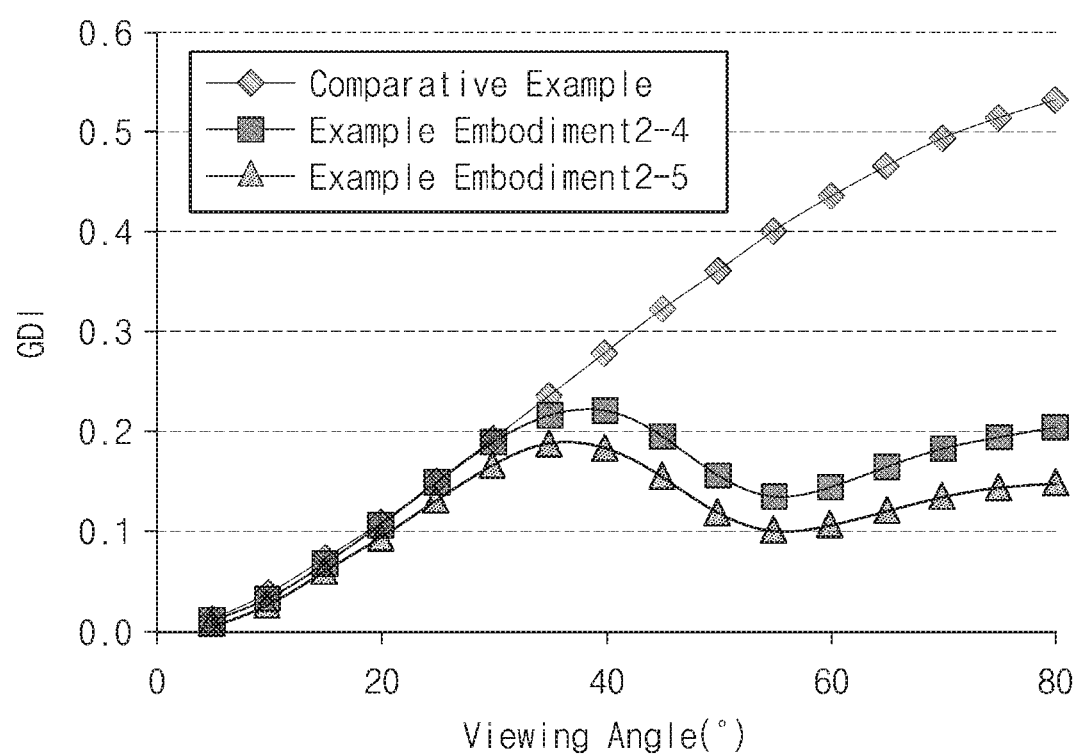
FIG. 22 is a graph showing viewing angle characteristics of display devices according to embodiments and comparative examples.

FIGS. 21 and 22 and Table 2 show measurement data of viewing angle characteristics of display devices, in which optical films according to embodiments of the inventive concept are included, and a display device according to a comparative example. Table 2 comparatively summarizes front-side white light brightness values, 30° GDI values, and 60° GDI values in the display devices according to the comparative examples and example embodiments, similar to Table 1 described above.

The example embodiments 2-1 to 2-3 in FIGS. 21 and 22 and Table 2 show data measured from display devices including the afore-described optical film according to the embodiment of FIG. 19, and the example embodiments 2-4 and 2-5 show data measured from display devices including an optical film with a protrusion, in which the inclination angles $\theta_{1-d}$, $\theta_{2-d}$, $\theta_{3-d}$, $\theta_{4-d}$, and $\theta_{5-d}$ of the side surfaces of the first to fifth sub-protrusions are 76°, 90°, 76°, 90°, and 76°, respectively, unlike the structure shown in FIG. 19.

Meanwhile, the comparative example show data measured from a display device, in which the optical film was not included, and which was fabricated to have the same structure as the display device of FIG. 3, except for the absence of the optical unit OU.

In the case of the optical film in the example embodiment 2-1, the width of the bottom surface of the first sub-protrusion was 8 µm, the distance $W_d$ between adjacent ones of the protrusions was 4 µm, and the height of the protrusion was 10 µm. In addition, the width of the bottom surface of the third sub-protrusion was 6 µm, and the width of the bottom surface of the fifth sub-protrusion was 4 µm.

In the cases of the optical films in the example embodiments 2-2 and 2-3, the width of the bottom surface of the first sub-protrusion was 8 µm, the distance $W_d$ between adjacent ones of the protrusions was 4 µm, and the height of the protrusion was 10 µm. In addition, the width of the bottom surface of the third sub-protrusion was 7 µm, and the width of the bottom surface of the fifth sub-protrusion was 6 µm.

In the cases of the optical films in the example embodiments 2-4 and 2-5, the width of the bottom surface of the first sub-protrusion was 8 µm, the distance $W_d$ between adjacent ones of the protrusions was 4 µm, and the height of the protrusion was 10 μm. In addition, the width of the bottom surface of the second sub-protrusion was 7 μm, the width of the bottom surface of the fourth sub-protrusion was 6 μm, and the width of the upper surface of the fifth sub-protrusion was 5 μm.

TABLE 2

| Embodiments | Refractive index of first pattern layer | Refractive index of second pattern layer | Inclination angles of side surfaces of sub-protrusions | White light brightness (nit) | 30° GDI | 60° GDI |
|---|---|---|---|---|---|---|
| Comparative example | — | — | — | 368 | 0.192 | 0.435 |
| Example Embodiment 2-1 | 1.60 | 1.47 | 90°/63°/90°/63°/90° | 373 | 0.210 | 0.222 |
| Example Embodiment 2-2 | 1.60 | 1.47 | 90°/76°/90°/76°/90° | 348 | 0.198 | 0.190 |
| Example Embodiment 2-3 | 1.60 | 1.40 | 90°/76°/90°/76°/90° | 343 | 0.178 | 0.135 |
| Example Embodiment 2-4 | 1.60 | 1.47 | 76°/90°/76°/90°/76° | 345 | 0.189 | 0.145 |
| Example Embodiment 2-5 | 1.60 | 1.40 | 76°/90°/76°/90°/76° | 338 | 0.167 | 0.106 |

Table 2 shows that the example embodiments 2-1 to 2-5 had improved GDI values in a direction of a viewing angle of 60°, compared with the comparative example, in which the optical film is included. In addition, the 30° GDI values in a direction of a viewing angle of 30° had equivalent or improved values, compared with the comparative example. Furthermore, as shown in the graphs of FIGS. 21 and 22, the GDI values in a direction of a lateral viewing angle of 40° or greater were better in the example embodiments than in the comparative example.

These results show that a display device including the optical film described with reference to FIGS. 19 and 20 has improved display quality in a lateral direction compared with the comparative example.

Figure 23:
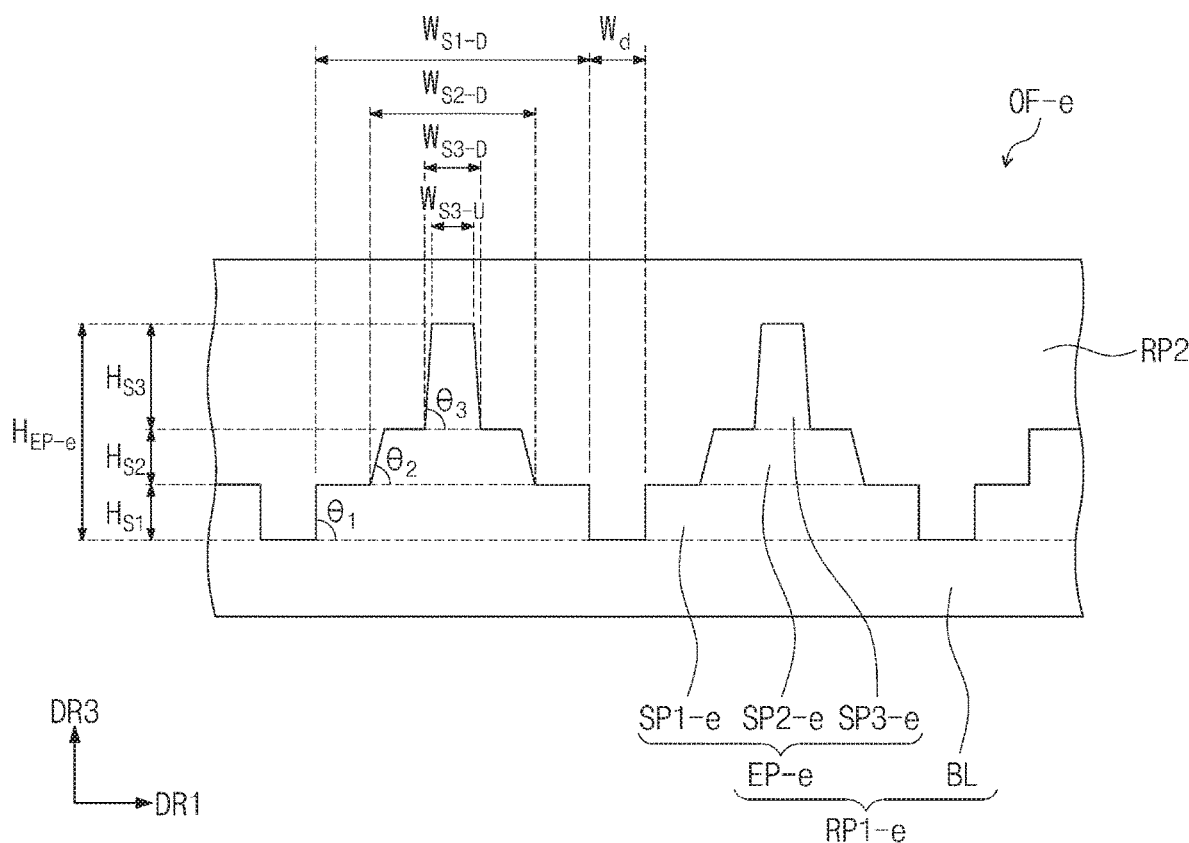
FIG. 23 is a sectional view illustrating a portion of an optical film according to an embodiment.
Figure 24:
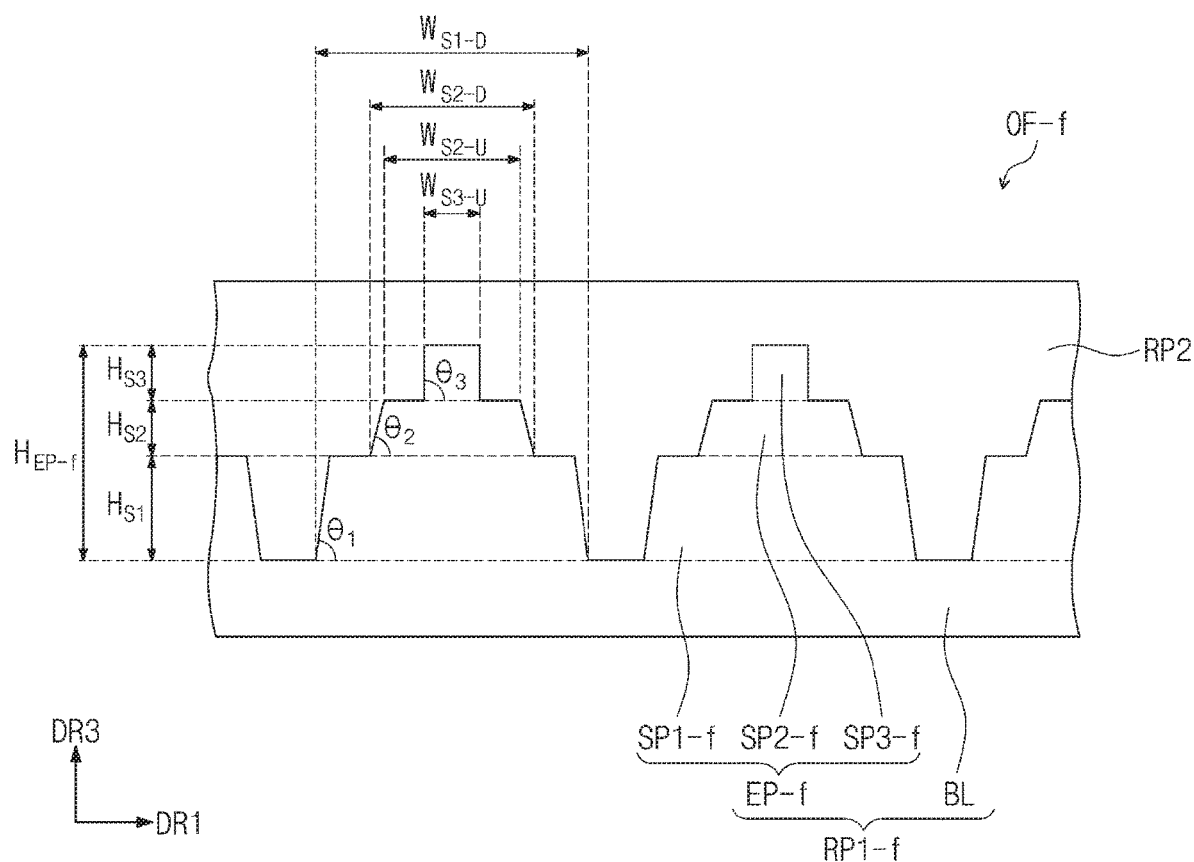
FIG. 24 is a sectional view illustrating a portion of an optical film according to an embodiment.

FIGS. 23 and 24 are sectional views illustrating optical films according to some embodiments of the inventive concept. In optical films OF-e and OF-f according to some embodiments of the inventive concept, each of protrusions EP-e and EP-f may include three sub-protrusions.

Referring to FIG. 23, the optical film OF-e may include a first pattern layer RP1-e that includes a plurality of protrusions EP-e, and the second pattern layer RP2, that is disposed on the first pattern layer RP1-e. A difference in refractive index between the first pattern layer RP1-e and the second pattern layer RP2 may be greater than or equal to 0.1.

The protrusions EP-e may include first to third sub-protrusions SP1-e, SP2-e, and SP3-e, which are stacked in its thickness direction (e.g., in a direction parallel to the third direction axis DR3). The inclination angles θ1, $θ_2$, and $θ_3$ of the side surfaces of the first to third sub-protrusions SP1-e, SP2-e, and SP3-e may each independently range from 45° to 90°. For example, in the optical film OF-e according to an embodiment of the inventive concept, the inclination angle of the side surface may decrease in a direction away from the base portion BL (e.g., in a direction from the first sub-protrusion SP1-e to the third sub-protrusion SP3-e). In an embodiment, when measured in a section perpendicular to the base portion BL, the inclination angle $θ_1$ of the side surface of the first sub-protrusion SP1-e may be 90°, and the inclination angles $θ_2$ and $θ_3$ of the side surfaces of the second sub-protrusion SP2-e and the third sub-protrusion SP3-e may be greater than or equal to 60° and may be smaller than 85°. For example, the inclination angle $θ_2$ of the side surface of the second sub-protrusion SP2-e may be 83°, and the inclination angle $θ_3$ of the side surface of the third sub-protrusion SP3-e may be 76°.

Heights $H_{S1}$, $H_{S2}$, and $H_{S3}$ of the first to third sub-protrusions SP1-e, SP2-e, and SP3-e may be the same or different from each other. In an embodiment, the height $H_{S3}$ of the third sub-protrusion SP3-e may be greater than the heights $H_{S1}$ and $H_{S2}$ of the first and second sub-protrusions SP1-e and SP2-e.

The optical film OF-f shown in FIG. 24 may include a first pattern layer RP1-f that includes a plurality of protrusions EP-f, and the second pattern layer RP2 that is disposed on the first pattern layer RP1-f. A difference in refractive index between the first pattern layer RP1-f and the second pattern layer RP2 may be greater than or equal to 0.1.

Each of the protrusions EP-f may include first to third sub-protrusions SP1-f, SP2-f, and SP3-f, which are sequentially stacked in its thickness direction (e.g., in a direction parallel to the third direction axis DR3). Inclination angles $θ_1$, $θ_2$, and $θ_3$ of side surfaces of the first to third sub-protrusions SP1-f, SP2-f, and SP3-f may each independently range from 45° to 90°. The inclination angles $θ_1$, $θ_2$, and $θ_3$ of the side surfaces of the first to third sub-protrusions SP1-f, SP2-f, and SP3-f may be different from each other. For example, when measured in a section perpendicular to the base portion BL, the inclination angle $θ_1$ of the side surface of the first sub-protrusion SP1-f may be 83°, the inclination angle $θ_2$ of the side surface of the second sub-protrusion SP2-f may be 76°, and the inclination angle $θ_3$ of the side surface of the third sub-protrusion SP3-e may be 90°.

The first to third sub-protrusions SP1-f, SP2-f, and SP3-f may have heights $H_{S1}$, $H_{S2}$, and $H_{S3}$, which are the same or different from each other. In an embodiment, the height $H_{S1}$ of the first sub-protrusion SP1-f may be greater than the heights $H_{S2}$ and $H_{S3}$ of the second and third sub-protrusions SP2-f and SP3-f.

FIGS. 23 and 24 illustrate an example in which side surfaces of a plurality of sub-protrusions included in the protrusion have different inclination angles from each other and the sub-protrusions have different heights from each other.

Figure 25:
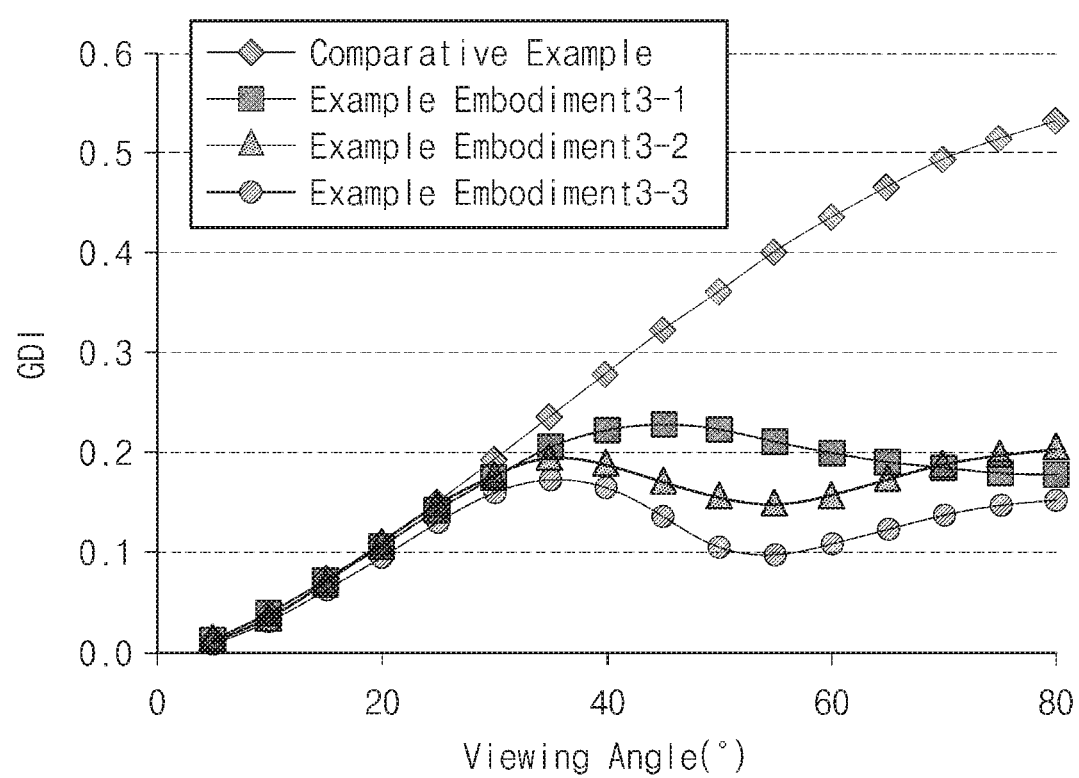
FIG. 25 is a graph showing viewing angle characteristics of display devices according to embodiments and comparative examples.

FIG. 25 and Table 3 show measurement data of viewing angle characteristics of display devices, in which optical films according to some embodiments of the inventive concept are included, and a display device according to a comparative example. Table 3 summarizes front-side white light brightness values, 30° GDI values, and 60° GDI values in the display devices according to the comparative and example embodiments, similar to Table 1 or 2 described above.

The example embodiment 3-1 in FIG. 25 and Table 3 shows data measured from a display device including the afore-described optical film according to the embodiment of FIG. 23, and the example embodiments 3-2 and 3-3 show data measured from display devices including the afore-described optical film according to the embodiment of FIG. 24. Meanwhile, the comparative example show data measured from a display device, in which the optical film was not included, and which was fabricated to have the same structure as the display device of FIG. 3, except for the absence of the optical unit OU.

In the case of the optical film in the example embodiment 3-1, the width $W_{S1-D}$ of the bottom surface of the first sub-protrusion was 20 μm, the width $W_{S2-D}$ of the bottom surface of the second sub-protrusion was 14 μm, the width $W_{S3-D}$ of the bottom surface of the third sub-protrusion was 7 μm, and the width $W_{S3-U}$ of the upper surface of the third sub-protrusion was 3 μm. In addition, the distance $W_d$ between adjacent ones of the protrusions was 4 μm, and the height $H_{EP-e}$ of the protrusion was 16 μm. In addition, the heights $H_{S1}$ and $H_{S2}$ of the first and second sub-protrusions were 4 μm, and the height $H_{S3}$ of the third sub-protrusion was 8 μm.

In the cases of the optical films in the example embodiments 3-2 and 3-3, the width $W_{S1-D}$ of the bottom surface of the first sub-protrusion was 12 μm, the width $W_{S2-D}$ of the bottom surface of the second sub-protrusion was 8.5 μm, the width $W_{S2-U}$ of the upper surface was 5.5 μm, and the width $W_{S3-U}$ of the upper surface of the third sub-protrusion was 3.5 μm. In addition, the distance $W_d$ between adjacent ones of the protrusions was 4 μm, and the height $H_{EP-f}$ of the protrusion was 18 μm. In addition, the heights $H_{S1}$ to $H_{S3}$ of the first and second sub-protrusions were 6 μm.

TABLE 3

| Embodiments | Refractive index of first pattern layer | Refractive index of second pattern layer | Inclination angles of side surfaces of sub-protrusions | White light brightness (nit) | 30° GDI | 60° GDI |
|---|---|---|---|---|---|---|
| Comparative example | — | — | — | 368 | 0.192 | 0.435 |
| Example Embodiment 3-1 | 1.60 | 1.47 | 90°/83°/76° | 350 | 0.175 | 0.200 |
| Example Embodiment 3-2 | 1.60 | 1.47 | 83°/76°/90° | 345 | 0.178 | 0.158 |
| Example Embodiment 3-3 | 1.60 | 1.40 | 83°/76°/90° | 342 | 0.161 | 0.109 |

Table 3 shows that the example embodiments 3-1 to 3-3 had improved GDI values in a direction of a viewing angle of 60°, compared with the comparative example, in which the optical film is included. In addition, the 30° GDI values in a direction of a viewing angle of 30° had equivalent or improved values, compared with the comparative example. Furthermore, as shown in the graph of FIG. 25, the GDI values in a direction of a lateral viewing angle of 40° or greater were better in the example embodiments than in the comparative example.

These results show that, if a display device is configured to include the optical film described with reference to FIGS. 23 and 24, a display quality in a lateral direction can be improved, compared with the comparative example.

According to an embodiment of the inventive concept, since the optical film includes a protruding pattern including a plurality of sub-protrusions, it may be possible to widen a direction in which light incident into the optical film is dispersed, and thus, the optical film may be used to improve lateral viewing angle characteristics of a display device.

Figure 26:
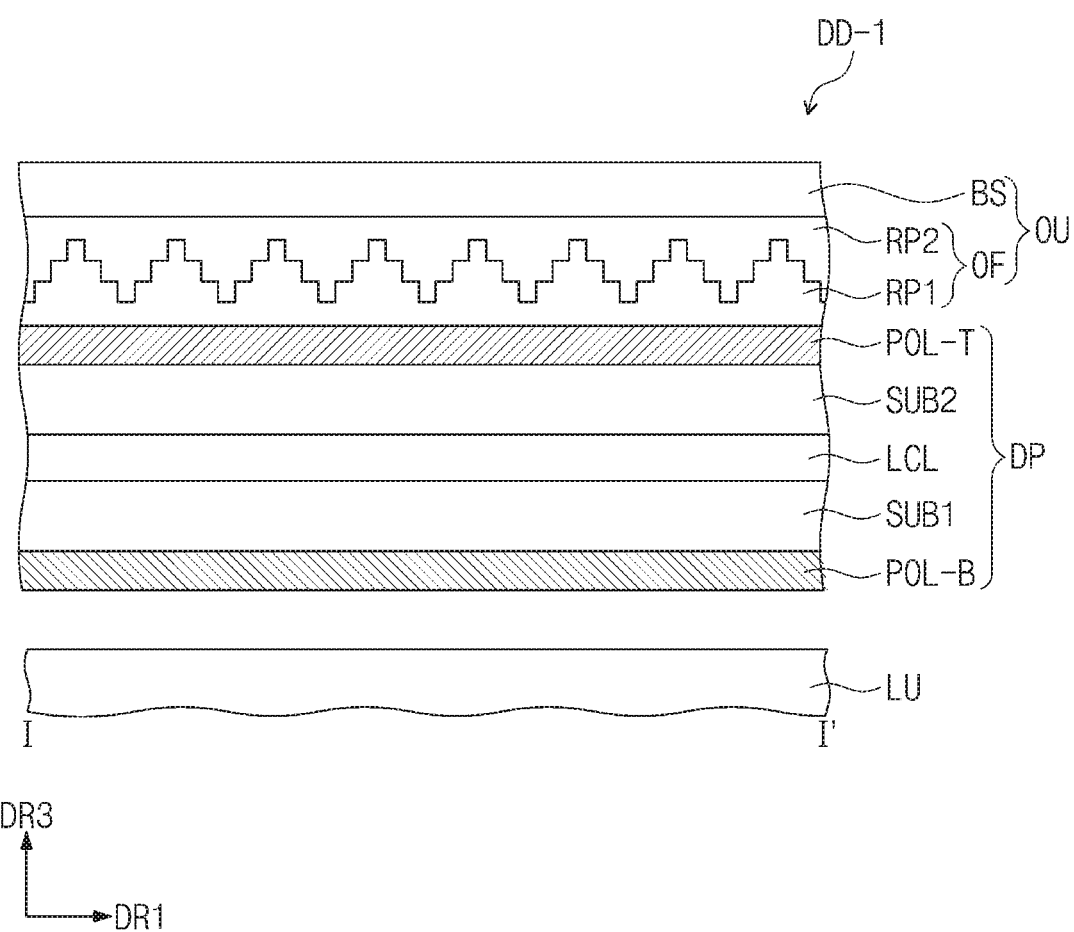
FIG. 26 is a sectional view illustrating a display device according to an embodiment.

FIG. 26 is a sectional view illustrating a display device according to an embodiment of the inventive concept. In the following description of the optical film shown in FIG. 26, an element previously described with reference to FIGS. 1 to 25 will be identified by the same reference number without repeating an overlapping description thereof. A display device DD-1 according to an embodiment of the inventive concept may include the liquid crystal display panel DP and the optical film OF disposed on the liquid crystal display panel DP. In an embodiment, the display device DD-1 may include the light source unit LU, which is disposed below the liquid crystal display panel DP, and the optical unit OU, which is disposed on the liquid crystal display panel DP and includes the optical film OF.

The optical film OF of the display device DD-1 may include the first pattern layer RP1 and the second pattern layer RP2. A difference in refractive index between the first pattern layer RP1 and the second pattern layer RP2 may be greater than or equal to 0.1.

In the optical film OF of the display device DD-1, the disposition of the first and second pattern layers RP1 and RP2 may be substantially the same as that of the optical film OF previously described with reference to FIG. 9.

In the optical film OF according to an embodiment of the inventive concept, the first pattern layer RP1 may serve as an adhesive layer. The first pattern layer RP1 may be used as combine the polarization layer POL-T of the liquid crystal display panel DP to the optical unit OU. For example, the first pattern layer RP1 may be an optical clear adhesive layer.

That is, in the display device DD-, the optical film OF may be directly disposed on the liquid crystal display panel DP. When compared with the display device DD of FIG. 3, the adhesive layer AD between the liquid crystal display panel DP and the optical unit OU may be omitted.

According to an embodiment of the inventive concept, a display device may include an optical film, which is disposed on a liquid crystal display panel and includes two pattern layers having different refractive indices, and this may make it possible to improve optical characteristics (e.g., viewing angle and front brightness) of the display device.

According to an embodiment of the inventive concept, the optical film may include a protrusion having a side surface, which is defined by a plurality of sub-protrusions, in an optical pattern layer, and the side surface of the protrusion may include at least one step portion. Accordingly, it may be possible to increase an optical dispersion effect in the side surface of the protrusion and thereby to allow the display device to have an improved display quality. Furthermore, the optical film according to an embodiment of the inventive concept may include a protrusion, which is formed by a plurality of stacked sub-protrusions, and here, by variously adjusting the number, sectional shapes, and sizes of the sub-protrusions, it may be possible to realize a optimized combination for the protrusion and thereby to allow the display device to have an improved display quality.

According to an embodiment of the inventive concept, an optical film is provided to include a pattern layer, in which a protrusion has an optimized shape, and thus, it is possible to improve a display quality of a display device.

According to an embodiment of the inventive concept, an optical film is provided to include a pattern layer, in which sub-protrusions in protrusions have optimized shape, size, and disposition, and thus, it is possible to provide a display device, whose display quality is improved in a direction of a lateral viewing angle.

While embodiments of the inventive concepts have been particularly shown and described, it will be understood by one of ordinary skill in the art that variations in form and detail may be made therein without departing from the spirit and scope of the attached claims.

What is claimed is:

1. An optical film, comprising:
   a first pattern layer having a first refractive index and including a base portion and a plurality of protrusions on the base portion; and
   a second pattern layer disposed on the first pattern layer and having a second refractive index different from the first refractive index, wherein each of the plurality of protrusions comprises n sub-protrusions (n is an integer of 2 or greater), which are stacked in a thickness direction of the base portion, wherein the n sub-protrusions have a first sub-protrusion that has a trapezoidal shape, when viewed in a sectional view perpendicular to the base portion, wherein a side surface of each of the plurality of protrusions defined by the n sub-protrusions comprises at least one step portion, and wherein a first inclination angle of a first side surface of the first sub-protrusion relative to the base portion is less than 90°.

2. The optical film of claim 1, wherein the n sub-protrusions have a second sub-protrusion that has a rectangular shape, when viewed in the sectional view perpendicular to the base portion.

3. The optical film of claim 1, wherein each of the sub-protrusions comprises a bottom surface adjacent to the base portion, an upper surface opposite to the bottom surface, and a side surface connecting the bottom surface to the upper surface, and wherein an inclination angle of the side surface of each of the plurality of protrusions relative to the bottom surface is greater than 45°.

4. The optical film of claim 3, wherein, in each of the plurality of protrusions, a ratio of a height of the protrusion to a width of the bottom surface satisfies the condition given by the following formula:

$$0.3 \leq (\text{a height of protrusion})/(\text{a width of bottom surface of protrusion}) \leq 3.0,$$

wherein in the formula, the width of the bottom surface of the protrusion is a smallest width of the bottom surface, when measured in a section perpendicular to the base portion, and the height of the protrusion is a smallest distance between the bottom surface and the upper surface, when measured in the section perpendicular to the base portion.

5. The optical film of claim 3, wherein the step portion is defined by an exposed surface of an m-th sub-protrusion and a side surface of an (m+1)-th sub-protrusion (m is an integer that is greater than or equal to 1 and is smaller than and equal to (n−1)), and wherein the exposed surface is a portion of an upper surface of the m-th sub-protrusion, which is not overlapped with the (m+1)-th sub-protrusion.

6. The optical film of claim 5, wherein a width of the exposed surface and a length of the side surface of the sub-protrusion each range from 1 µm to 10 µm.

7. The optical film of claim 3, wherein the step portion is defined by the side surfaces of adjacently-stacked ones of the sub-protrusions.

8. The optical film of claim 3, wherein a smallest width of an upper surface of the n-th sub-protrusion is greater than 0 µm and is smaller than or equal to 10 µm.

9. The optical film of claim 1, wherein a difference between the first refractive index and the second refractive index is greater than or equal to 0.1.

10. The optical film of claim 1, wherein a smallest distance between adjacent ones of the plurality of protrusions ranges from 0 µm to 10 µm.

11. The optical film of claim 1, wherein each of the plurality of protrusions has a center and a symmetric shape with respect to an imaginary line passing through the center and extending in the thickness direction, when viewed in the sectional view perpendicular to the base portion.

12. The optical film of claim 1, wherein each of the plurality of protrusions further comprises an edge protrusion disposed on the n-th sub-protrusion, and wherein the edge protrusion has a triangular shape, when viewed in the sectional view perpendicular to the base portion.

13. The optical film of claim 1, wherein the n sub-protrusions have sectional areas that decrease in area with increasing distance from the base portion, when measured in a section perpendicular to the base portion.

14. The optical film of claim 1, wherein each of the plurality of protrusions has a stripe shape extending in a specific direction.

15. An optical film, comprising:
a first pattern layer having a first refractive index and including a base portion and a plurality of protrusions on the base portion; and
a second pattern layer disposed on the first pattern layer and having a second refractive index different from the first refractive index,
wherein each of the plurality of protrusions comprises a first sub-protrusion having a trapezoidal shape, and a second sub-protrusion disposed on the first sub-protrusion and having a quadrilateral shape that is different from the trapezoidal shape, when viewed in a sectional view perpendicular to the base portion,
wherein the first sub-protrusion comprises a first bottom surface adjacent to the base portion, a first upper surface opposite to the first bottom surface, and a first side surface connecting the first bottom surface to the first upper surface,
wherein the second sub-protrusion comprises a second bottom surface adjacent to the first sub-protrusion, a second upper surface opposite to the second bottom surface, and a second side surface connecting the second bottom surface to the second upper surface, and
wherein a smallest width of the second upper surface is smaller than a smallest width of the first upper surface, when measured in a section perpendicular to the base portion.

16. The optical film of claim 15, wherein each of the plurality of protrusions further comprises a third sub-protrusion disposed on the second sub-protrusion,
wherein the third sub-protrusion comprises a third bottom surface adjacent to the second sub-protrusion, a third upper surface opposite to the third bottom surface, and a third side surface connecting the third bottom surface to the third upper surface, and
wherein a smallest width of the third upper surface is smaller than the smallest width of the second upper surface, when measured in the section perpendicular to the base portion.

17. The optical film of claim 16, wherein a first inclination angle of the first side surface to the first bottom surface, a second inclination angle of the second side surface to the second bottom surface, and a third inclination angle of the third side surface to the third bottom surface each are different from one another and are greater than 45°.

18. The optical film of claim 16, wherein each of the plurality of protrusions has a polygonal shape having eleven or more sides, when viewed in the sectional view perpendicular to the base portion.

19. A display device, comprising:
a liquid crystal display panel; and
an optical film disposed on the liquid crystal display panel,
wherein the optical film comprises:
a first pattern layer having a first refractive index and including a base portion and a plurality of protrusions on the base portion; and a second pattern layer disposed on the first pattern layer and having a second refractive index different from the first refractive index, wherein each of the plurality of protrusions comprises n sub-protrusions (n is an integer of 2 or greater) that are stacked in a thickness direction of the base portion, wherein the n sub-protrusions have a first sub-protrusion that has a trapezoidal shape, when viewed in a sectional view perpendicular to the base portion, wherein a side surface of the protrusion defined by the n sub-protrusions comprises at least one step portion, and wherein a first inclination angle of a first side surface of the first sub-protrusion relative to the base portion is less than 90°.

20. The display device of claim 19, wherein the n sub-protrusions have a second sub-protrusion that has a quadrilateral shape that is different from the trapezoidal shape, when viewed in the sectional view perpendicular to the base portion.

21. The display device of claim 19, wherein each of the sub-protrusions comprises a bottom surface adjacent to the base portion, an upper surface opposite to the bottom surface, and a side surface connecting the bottom surface to the upper surface, and wherein an inclination angle of the side surface of each of the plurality of protrusions relative to the bottom surface is greater than 45° to 90°.

22. The display device of claim 21, wherein the step portion is defined by an exposed surface of an m-th sub-protrusion and a side surface of an (m+1)-th sub-protrusion (m is an integer that is greater than or equal to 1 and is smaller than and equal to (n−1)), and wherein the exposed surface is a portion of an upper surface of the m-th sub-protrusion, which is not overlapped with the (m+1)-th sub-protrusion.

23. The display device of claim 21, wherein the step portion is defined by the side surfaces of adjacently-stacked ones of the sub-protrusions.

* * * * *